(12) United States Patent
Faibish et al.

(10) Patent No.: US 11,687,433 B2
(45) Date of Patent: Jun. 27, 2023

(54) USING MACHINE LEARNING TO DETECT SYSTEM CHANGES

(71) Applicant: EMC IP Holding Company LLC, Hopkinton, MA (US)

(72) Inventors: Sorin Faibish, Newton, MA (US); James M. Pedone, Jr., West Boylston, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1093 days.

(21) Appl. No.: 16/398,477

(22) Filed: Apr. 30, 2019

(65) Prior Publication Data

US 2020/0349047 A1   Nov. 5, 2020

(51) Int. Cl.
*G06N 3/08* (2023.01)
*G06N 3/045* (2023.01)
*G06F 11/32* (2006.01)

(52) U.S. Cl.
CPC .......... *G06F 11/327* (2013.01); *G06N 3/045* (2023.01); *G06N 3/08* (2013.01)

(58) Field of Classification Search
CPC ......... G06F 11/37; G06N 3/0454; G06N 3/08
See application file for complete search history.

(56) References Cited

PUBLICATIONS

Basak, S., et al, A Data-driven Prognostic Architecture for Online Monitoring of Hard Disks Using Deep LSTM Networks, Retrieved from Internet:<chrome-extension://efaidnbmnnnibpcajpcglclefindmkaj/https://scopelab.ai/files/Basak2018.pdf> (Year: 2018).*
Tan, C., et al, A Survey on Deep Transfer Learning, Retrieved from Internet:<https://link.springer.com/chapter/10.1007/978-3-030-01424-7_27> (Year: 2018).*
Gauntt, N., Survey of Implementation and Visualization of Neural Networks, Retrieved from Internet:<chrome-extension://efaidnbmnnnibpcajpcglclefindmkaj/https://www.cs.unm.edu/~negaunt/manuscripts/Survey_Impl_Vis_NN-Gauntt,N-2009.pdf> (Year: 2009).*

(Continued)

*Primary Examiner* — Miranda M Huang
*Assistant Examiner* — Bart I Rylander
(74) *Attorney, Agent, or Firm* — Muirhead and Saturnelli, LLC

(57) ABSTRACT

Techniques for detecting state changes in a system may include receiving a first neural network that is trained to detect when the system transitions into a first resulting state, wherein the system transitions into at least a first intermediate state prior to transitioning into the final resulting state; training the first neural network using a first plurality of inputs denoting the system in the first intermediate state; obtaining a plurality of sets of internal state information of the first neural network, each set of the plurality of sets denoting an internal state of the first neural network at a different point in time after the first neural network has processed at least a portion of the first plurality of inputs; and training a second neural network, using the plurality of sets of internal state information, to detect the first intermediate state.

19 Claims, 34 Drawing Sheets

(56) References Cited

PUBLICATIONS

Shin, H., et al, Deep Convolutional Neural Networks for Computer-Aided Detection: CNN Architectures, Dataset Characteristics and Transfer Learning, Retrieved from Internet:<https://ieeexplore.ieee.org/abstract/document/7404017/> (Year: 2016).*

Ji, X., et al, A Proactive Fault Tolerance Scheme for Large Scale Storage Systems, Retrieved from Internet:<https://link.springer.com/chapter/10.1007/978-3-319-27137-8_26> (Year: 2015).*

Sorin Faibish, et al., "Managing Performance of a Server Using Machine Learning Systems," U.S. Appl. No. 15/884,793, filed Jan. 31, 2018.

Sorin Faibish, et al., "Predicting Performance of Applications Using Machine Learning Systems," U.S. Appl. No. 15/970,943, filed May 4, 2018.

Sorin Faibish, et al., "Analyzing Storage Systems Using Machine Learning Systems," U.S. Appl. No. 15/971,171, filed May 4, 2018.

\* cited by examiner

| Hidden layer 1 | Hidden layer 2 | Hidden layer N | Output Layer |
| --- | --- | --- | --- |
| Neuron 1.1, Wgt1 | Neuron 2.1, Wgt1 | Neuron N.1, Wgt1 | Neuron N+1.1, Wgt1 |
| Neuron 1.1, Wgt2 | Neuron 2.2, Wgt2 | Neuron N.2, Wgt 2 | Neuron N+1.2, Wgt2 |
| .. | .. | .. | .. |
| .. | .. | .. | .. |
| Neuron 1. Max, Wgt1 | Neuron 2. Max, Wgt1 | Neuron N. Max, Wgt1 | Neuron N+1.Max, Wgt1 |
| Neuron 1. Max, Wgt2 | Neuron 2.Max, Wgt2 | Neuron N.Max, Wgt2 | Neuron N+1.Max, Wgt2 |
| .. | .. | .. | .. |

USING MACHINE LEARNING TO DETECT SYSTEM CHANGES

BACKGROUND

Technical Field

This application generally relates to analyzing and detecting system states using machine learning systems.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with one aspect of the techniques herein, a method, a system and a computer readable medium may be used to detect state changes in a system. A first neural network may be trained to detect when the system transitions into a resulting state. The system may transition into an intermediate state prior to the resulting state. While the first neural network is in a training mode to detect the intermediate state, the first neural network may process inputs denoting the system in the intermediate state. Internal weights of the first neural network may be adjusted in response to processing the inputs denoting the intermediate state. The internal weights of the first neural network may be obtained, for example, during training and/or validation phases as part of processing performed to train the first neural network to detect the intermediate state. The internal weights may be used to train a second neural network to detect the intermediate state. In at least one embodiment, at least some of the internal weights may be obtained when the first neural network is characterized as being in a steady state where, while the first neural network is in the training mode, the weights are relatively constant and stable and thereby minimally adjusted (e.g., within some specified tolerance or threshold) as different inputs denoting the intermediate state are provided to the first neural network.

Various embodiments of the techniques herein may include a method, a system and a computer readable medium for detecting state changes in a system comprising: receiving a first neural network that is trained to detect when the system transitions into a first resulting state, wherein the system transitions into at least a first intermediate state prior to transitioning into the final resulting state; training the first neural network using a first plurality of inputs denoting the system in the first intermediate state; obtaining a plurality of sets of internal state information of the first neural network, each set of the plurality of sets denoting an internal state of the first neural network at a different point in time after the first neural network has processed at least a portion of the first plurality of inputs; and training a second neural network, using the plurality of sets of internal state information, to detect the first intermediate state. Each set of the plurality of sets of internal state information may include weights that are applied to inputs of neurons of one or more hidden layers of the first neural network. Each set of the plurality of sets of internal state information may include weights that are applied to inputs of neurons of an output layer of the first neural network. The plurality of sets of internal state information include a plurality of images, wherein each of the plurality of images may represent weights applied to inputs of neurons of the first neural network. Each of the plurality of images may be a bitmap image. The first neural network is a convolutional neural network. The second neural network may be a convolutional neural network. A visual representation of the plurality of images may be provided on a user interface. A first input may be provided to the first neural network while the first neural network is in training mode, wherein the first input denotes the system in the first intermediate state. A first set of internal state information of the first neural network may be obtained where the first set denotes an internal state of the first neural network after the first neural network has processed the first input. Subsequent to training the second neural network to detect the first intermediate state, the first set of internal state information may be provided to the first neural network. In response to the first set of internal state information, the first intermediate state may be detected by the second neural network. An output may be generated by the second neural network indicating the first intermediate state denoted by the first input. A visual representation of the first set of internal state information of the first network may be provided on a user interface. Responsive to detecting the first intermediate state denoted by the first input, a responsive action may be taken. The first resulting state may denote a failed, malfunctioning, defective or unhealthy component of the system, and wherein the first intermediate state may denote a lesser severity of failure, malfunctioning, defectiveness or unhealthiness than the first resulting state. The responsive action may include an action that remediates or corrects the component prior to the component transitioning into the first resulting state. The responsive action may include an action that is a recovery operation to be completed prior to an expected future point in time when the component is estimated to transition to the first resulting state. The system may transition into a second intermediate state prior to transitioning into the final resulting state and wherein the system may transition into the second intermediate state after the first intermediate state. The first neural network may be trained using a second plurality of inputs denoting the system in the second intermediate state. A second plurality of sets of internal state information of the first neural network may be obtained where each set of the second plurality of sets of internal state information may denote an internal state of the first neural network at a different point in time after the first neural network has processed at least a portion of the second plurality of inputs. The second neural network may be trained, using the second plurality of sets of internal state information, to detect the second intermediate state. Each set of the second plurality of sets of internal state information may include adjusted weights that are applied to inputs of neurons of layers of the first neural network after the first neural network has processed at least a portion of the second plurality of inputs. The second plurality of sets of internal state information may include a plurality of images, wherein each of the plurality of images represents adjusted weights applied to inputs of neurons of the first neural network after the first neural network has processed at least a portion of the second plurality of inputs.

BRIEF DESCRIPTION OF THE DRAWINGS

Features and advantages of the present invention will become more apparent from the following detailed description of exemplary embodiments thereof taken in conjunction with the accompanying drawings in which:

FIG. 18A illustrates a matrix of weights denoting the internal state of a neural network in an embodiment in accordance with the techniques herein.

FIGS. 19A, 19B and 20 are flowcharts of processing steps that can be performed in at least one embodiment in an embodiment in accordance with the techniques of the present disclosure.

DETAILED DESCRIPTION OF EMBODIMENT(S)

Figure 1:
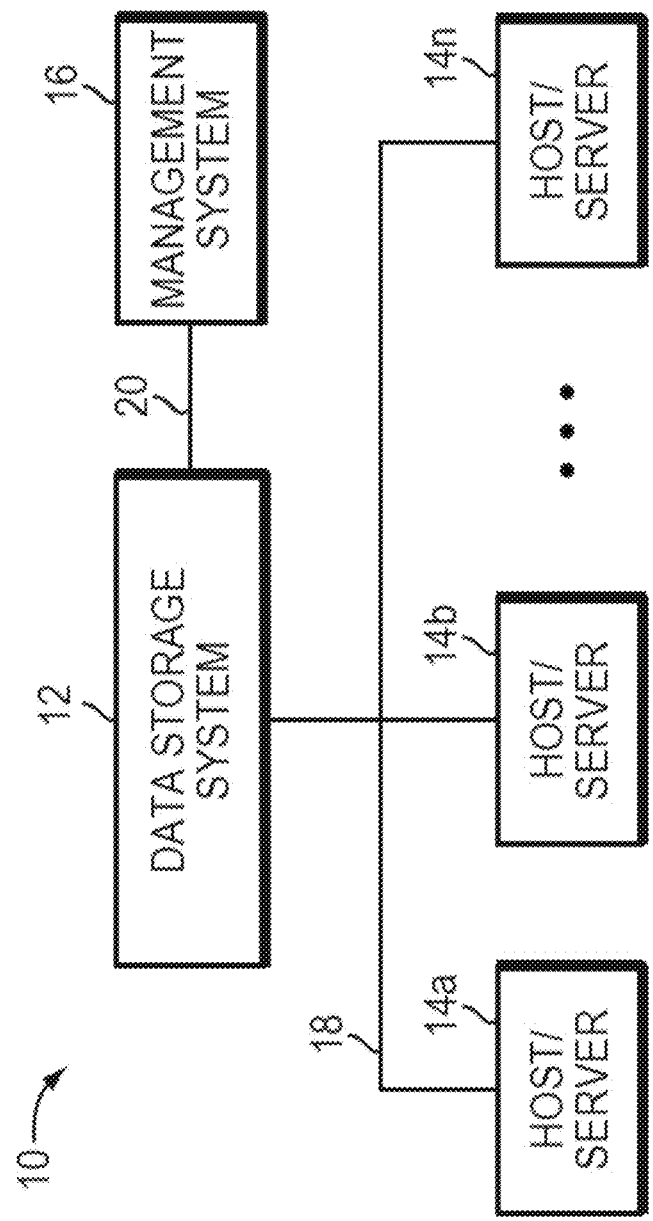
FIG. 1 is an example of components that may be included in a system in accordance with the techniques described herein.

Described below is a technique for use in analyzing a storage system using a machine learning system, which technique may be used to provide, among other things, analyzing data gathered from information associated with operations performed in a storage system, where the storage system is comprised of a plurality of components, creating a bitmap image based on the gathered data, where at least one of the plurality of components is represented in the bitmap image, and training the machine learning system using the bitmap image, where the bitmap image is organized to depict the plurality of components of the storage system.

As described herein, in at least one embodiment of the current technique logs and statistics are gathered from a storage system. A bitmap image is created from the logs representing the components in the storage system. A machine learning system is trained using the bitmap image as input. The output of the machine learning system is a graphical depiction of the components in the storage system represented as bitmap objects. A health assessment of each component is also depicted. For example, a component may be graphically depicted as a blue image when that component is functioning correctly, but may be graphically depicted as red when that component is functioning incorrectly.

In a conventional system, it is difficult or impossible to quickly detect a malfunction in a storage array when the malfunction occurs in the storage array thereby causing the storage array to become degraded in performance or result in an error. Generally, a user of a storage system expects a timely detection of a malfunction in a storage system and expects an ability to find a solution to the cause of the malfunction before the user has to call a storage vendor for providing support to address the malfunction. Consequently, storage vendors need to maintain a large number of customer support engineers to respond timely to customer complaints. Generally, data such as logs and statistical information is gathered from all the components and modules of a storage array including but not limited to hardware and software components. Thus, for example, when a malfunction is detected in a software module of a storage array, additional data such as statistical information is gathered. As a result, there is a large amount of statistical data that is collected and stored for a storage system. Conventional technologies may collect, for example, 4-5 GB of statistics and data logs per day for a storage system. Thus, in such a conventional system, it is difficult or impossible to analyze such a significant amount of data gathered in a storage system and determine what went wrong and what part of the storage system is malfunctioning and it can take a long time to analyze the data and logs and determine which component of the storage system is at fault. Thus, in such a conventional system, it requires maintaining a large staff of customer support engineers to respond quickly to customer complaints related to storage system malfunctions. Conventional technologies may require the staff of customer support engineers to spend days scanning all the logs to detect the source of the errors and faulty behavior of the storage system. In such a conventional system, such analysis of data and logs is performed manually, by inspecting the statistics and logs searching for errors.

Conventional technologies do not have an automated way to quickly identify a hardware and/or software problems in a storage system. While a customer may observe the data such as statistics and logs collected by a cloud based application, the customer cannot decipher such data and determine the source or cause of a malfunction in a storage system, even if the customer observes a change in the behavior of the storage system. For example, the customer may not be able to determine if a change in the behavior of a storage system is due to a malfunction, or due to a change in an application workload. Even the customer's Information Technology (IT) personnel and/or the vendor of the application might not be aware of the changes that a particular application may have on the Input/Output (IO) behavior of the storage array. Thus, even if IT personnel or the customer observes a change in behavior of the storage system, neither can determine if there is a fault in the hardware, for example, a failure of the disk, network, Fibre Channel port or Serial Attached Small Computer System Interface (SCSI) port. These types of failures degrade the performance of the storage system, and result in a change in behavior of the storage system. It is critical to determine the difference between simply workload changes, and actual hardware or software errors, and to determine whether and when to involve customer service engineering to locate and rectify any faulty behavior, with the least amount of disruption to the storage system.

Conventional technologies do not provide an automated mechanism that continuously monitors the storage system to detect changes that are a result of faulty components quickly enough to notify the customer service engineers to fix the faulty components. Further, in such a conventional system, manual inspection of data in log files take a large amount of time as the data stored in such logs can be significant in size and unstructured in format thereby making interpretation of such data significantly difficult. Conventional technologies of manually inspecting logs and statistics do not provide for learning from previous cases of malfunctions, other than to teach customer services engineers to look for certain storage system behaviors. This is particularly difficult when certain malfunctions may only occur once or twice during the life of a product. However, there may be hundreds of these types of malfunctions that only occur once or twice over the life of the product. Thus, conventional technologies require human intervention to decipher logs and statistics, and conventional technologies do not provide a way to share this acquired knowledge among the customer service engineers.

Conventional technologies do not organize the data collected by logs in a form that can be analyzed and interpreted quickly and easily to determine the faulty component(s). Conventional technologies cannot determine which components are faulty and also why the faulty components are failing. Conventional technologies cannot provide the level of detail necessary to determine the location of a faulty component and the level of severity associated with the malfunction.

By contrast, in at least some implementations in accordance with the current technique as described herein, a method analyzes data gathered from information associated with operations performed in a storage system, where the storage system is comprised of a plurality of components. The method creates a bitmap image based on the gathered data, where at least one of the plurality of components is represented in the bitmap image. The method trains a machine learning system using the bitmap image, where the bitmap image is organized to depict the plurality of components of the storage system.

Thus, in at least one embodiment of the current technique, the goal of the current technique is to identify malfunctions within a storage system, identify a location within the storage system associated with the malfunction, as well as to provide details associated with the severity of the malfunction. Another goal of the current technique is to quickly provide this information in a visual representation that intuitively informs a viewer which components are faulty, where in the component the malfunction occurred, and the severity of the malfunction. Additionally, the current technique provides a health assessment of components in the storage system by visually representing each component, along with an indication as to whether each component is functioning or malfunctioning.

In at least some implementations in accordance with the current technique described herein, the use of analyzing a storage system using a machine learning system technique can provide one or more of the following advantages: discerning between changes in an application workload versus a hardware and/or software malfunction, drastically reducing the time required to detect and resolve malfunctions that occur in a storage system, incorporating previously detected malfunctions into reach new release of hardware or software components of a storage system, facilitating sharing of acquired knowledge among customer service engineers, eliminating the need to interpret logs to identify malfunctions, providing a visual representation of the components in a storage system along with an indication of the health status associated with each component, identifying malfunctions within components, identifying the location of the malfunctions, and identifying a severity associated with the malfunction.

In contrast to conventional technologies, in at least some implementations in accordance with the current technique as described herein, a method analyzes data gathered from information associated with operations performed in a storage system, where the storage system is comprised of a plurality of components. The method creates a bitmap image based on the gathered data, where at least one of the plurality of components is represented in the bitmap image. The method trains a machine learning system using the bitmap image, where the bitmap image is organized to depict the plurality of components of the storage system. In an example embodiment of the current technique, the machine learning system detects a malfunction attributed to at least one component of the plurality of components depicted in the bitmap image by analyzing the bitmap image.

In an example embodiment of the current technique, the method detects a change between the bitmap image and a second bitmap image created from a different set of data. In an example embodiment of the current technique, the method modifies a representation of at least one component of the plurality of components in a graphical user interface to indicate the detected malfunction.

In an example embodiment of the current technique, the information associated with the operations performed in the storage system includes at least one of event logs and statistics gathered from the plurality of components of the storage system upon detection of a malfunction in at least one component of the plurality of components.

In an example embodiment of the current technique, the data gathered from information associated with operations performed in the storage system is gathered by using a cloud based management application.

In an example embodiment of the current technique, when the method creates the bitmap image based on the gathered data further, the method depicts each component of the plurality of components as a bitmap object in the bitmap image, where each bitmap object has a different shape and is associated with a different sized pixel based on an importance associated with the each component in the storage system.

In an example embodiment of the current technique, when the method trains the machine learning system using the bitmap image, the method trains the machine learning system to detect at least one of an object shape, an object edge, a plurality of pixels, a color associated with at least one pixel in the bitmap image, and at least one interaction between the plurality of components in the storage system.

In an example embodiment of the current technique, when the method trains the machine learning system using the bitmap image, the method trains the machine learning system to analyze the bitmap image to detect the difference between occurrence of at least one of malfunctions in the storage system and normal functioning of the storage system.

In an example embodiment of the current technique, the method analyzes data gathered from information associated with operations performed in a storage system, where the storage system is comprised of a plurality of components, and where the data is gathered from a cloud based management application. The method creates a bitmap image based on the gathered data, where at least one of the plurality of components is represented in the bitmap image. The method trains a machine learning system to analyze, in a cloud based environment, the bitmap image to detect the difference between occurrence of at least one of malfunctions in the storage system and normal functioning of the storage system.

Referring now to FIG. 1, shown is an example of an embodiment of a system that may be used in connection with performing the technique or techniques described herein. The system 10 includes one or more data storage systems 12 connected to host systems 14a-14n through communication medium 18. The system 10 also includes a management system 16 connected to the one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or SAN through Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a connection switch or other switching equipment that may exist such as a phone line, a repeater, a multiplexer or even a satellite. In at least one embodiment, the hosts may communicate with the data storage systems over an iSCSI or Fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems. Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment. Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices, or more generally non-volatile storage devices, such as, for example, an SATA disk drive, FC disk drive, flash drives (e.g., more generally solid state storage), and the like. Thus, the storage system may be made up of physical devices with different physical and performance characteristics (e.g., types of physical devices, disk speed such as in RPMs), Redundant Array of Independent Disks (RAID) levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
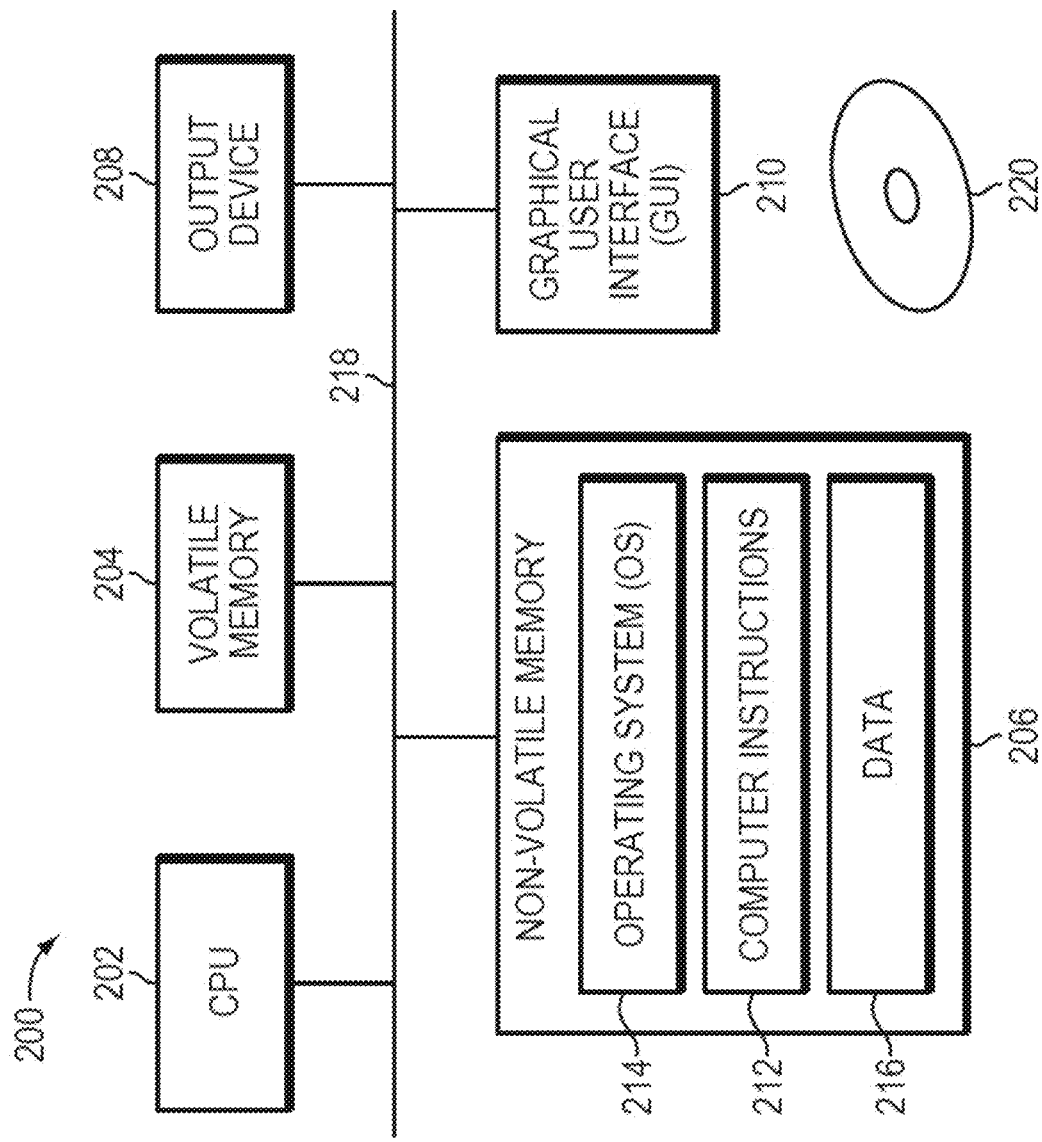
FIG. 2 is a block diagram of a computer, in accordance with an embodiment of the present disclosure.

FIG. 2 illustrates a block diagram of a computer 200 that can perform at least part of the processing described herein, according to one embodiment. The computer 200 may include a processor 202, a volatile memory 204, a non-volatile memory 206 (e.g., hard disk), an output device 208 and a graphical user interface (GUI) 210 (e.g., a mouse, a keyboard, a display, for example), each of which is coupled together by a bus 218. The non-volatile memory 206 may be configured to store computer instructions 212, an operating system 214, and data 216. In one example, the computer instructions 212 are executed by the processor 202 out of volatile memory 204. In one embodiment, an article 220 comprises non-transitory computer-readable instructions. In some embodiments, the computer 200 corresponds to a virtual machine (VM). In other embodiments, the computer 200 corresponds to a physical computer.

Figure 3:
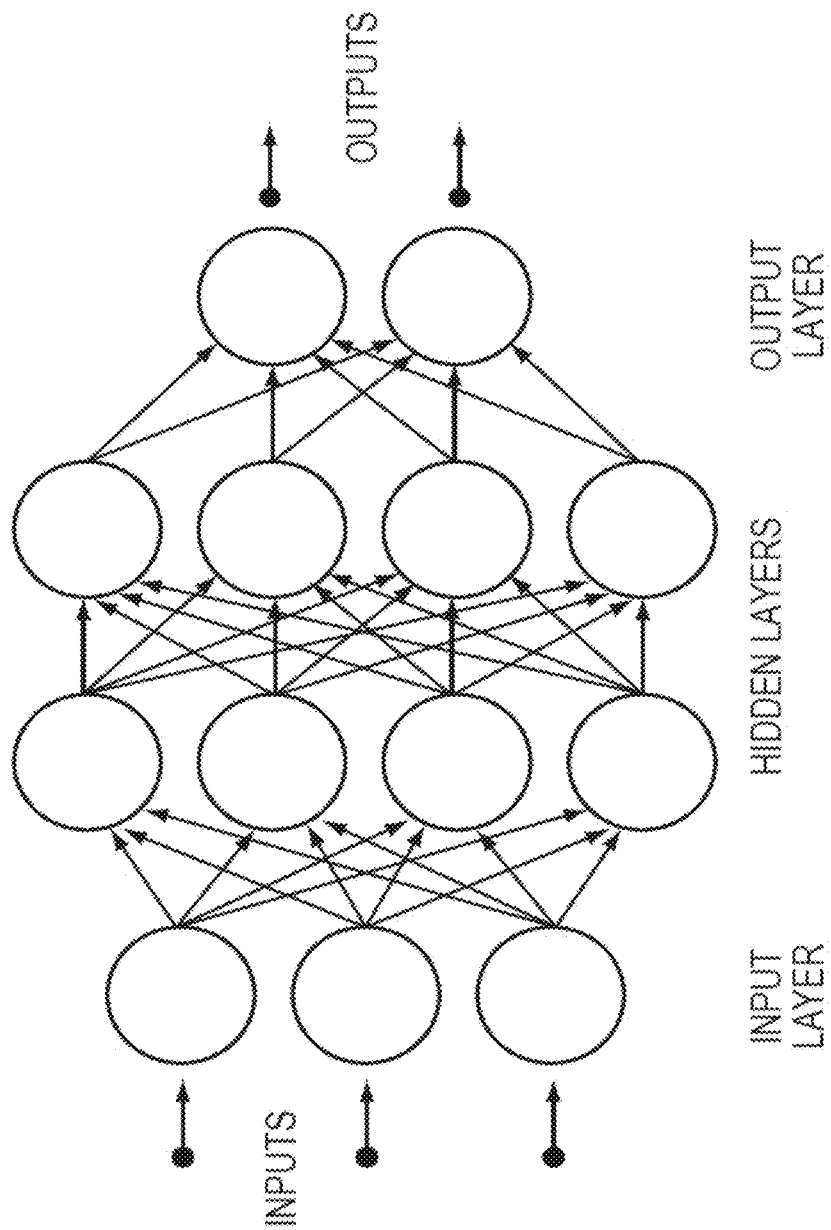
FIG. 3 illustrates an example of a multi-layer neural network.

FIG. 3 illustrates an example of a multi-layer neural network. In a storage system, multiple levels of logs and statistics may be collected from different components or modules (such as hardware or software) in a storage system. Each of the multiple levels of logs detect malfunctions of different modules in different software layers of the storage systems. This data may be used to manually train a machine learning system, such as a Neural Network, as illustrated in FIG. 3. The input data, however, is very unstructured and cannot be easily organized to train the Neural Network without human interpretation of the input (i.e., the logs and statistics), and the resulting output.

Figure 4:
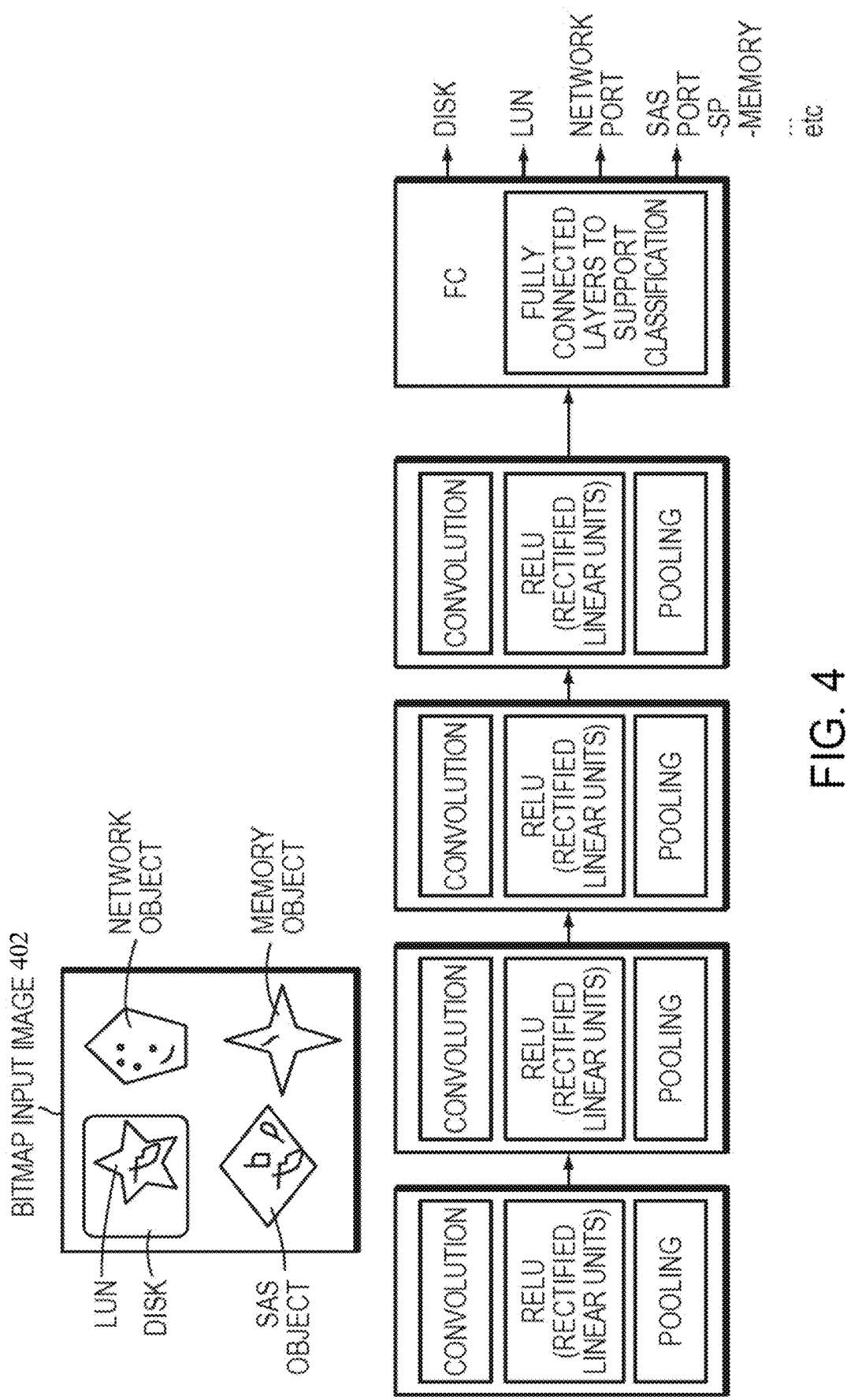
FIG. 4 illustrates creating a bitmap image from data from the logs and statistics collected by the storage system, in accordance with an embodiment of the present disclosure.

FIG. 4 illustrates creating a bitmap image 402 from data from the logs and statistics collected by the storage system, in accordance with an embodiment of the present disclosure. In an example embodiment, the method transforms the data from the logs and statistics collected by the storage system, and organizes the data as a bitmap image, as illustrated in FIG. 4. The bitmap image 402 may be used as input to the machine learning system for training and detecting malfunctions by detecting different bitmap objects in the bitmap (i.e., Disk, LUN, Network Port, SAS Port, SP, Memory, etc.). In an example embodiment, the machine learning system may use a neural network, such as a Convolutional Neural Network (CNN) that accepts images as input. The CNN preprocesses the images prior to their input into the machine learning system. In an example embodiment, the preprocessing comprises analyzing the logs and statistics, determining which components malfunctioned, and generating a bitmap image representing any faulty components.

The method transforms the data from the logs and statistics to create a bitmap image that is used as input to the machine learning system. In an example embodiment, the bitmap is created such that each module of the software in the storage array is mapped as a specific bitmap object in the bitmap image. The method detects when the bitmap objects within the bitmap image change over time, for example, when a malfunction occurs within a software module in the storage system. The bitmap is created such that each component in the storage system is represented by different shapes of objects in the bitmap with different sizes of pixels. In an example embodiment, the different sizes of pixels correspond to the importance of the module/component in the health of the entire storage system. For example the bitmap of the disk subsystem can use single pixel for each disk failure and double pixel for each RAID-5 LUN. As illustrated in FIG. 4, the bitmap image is created as a flowchart compute box, with the LUNs created as star shapes inside the compute box.

Figure 5:
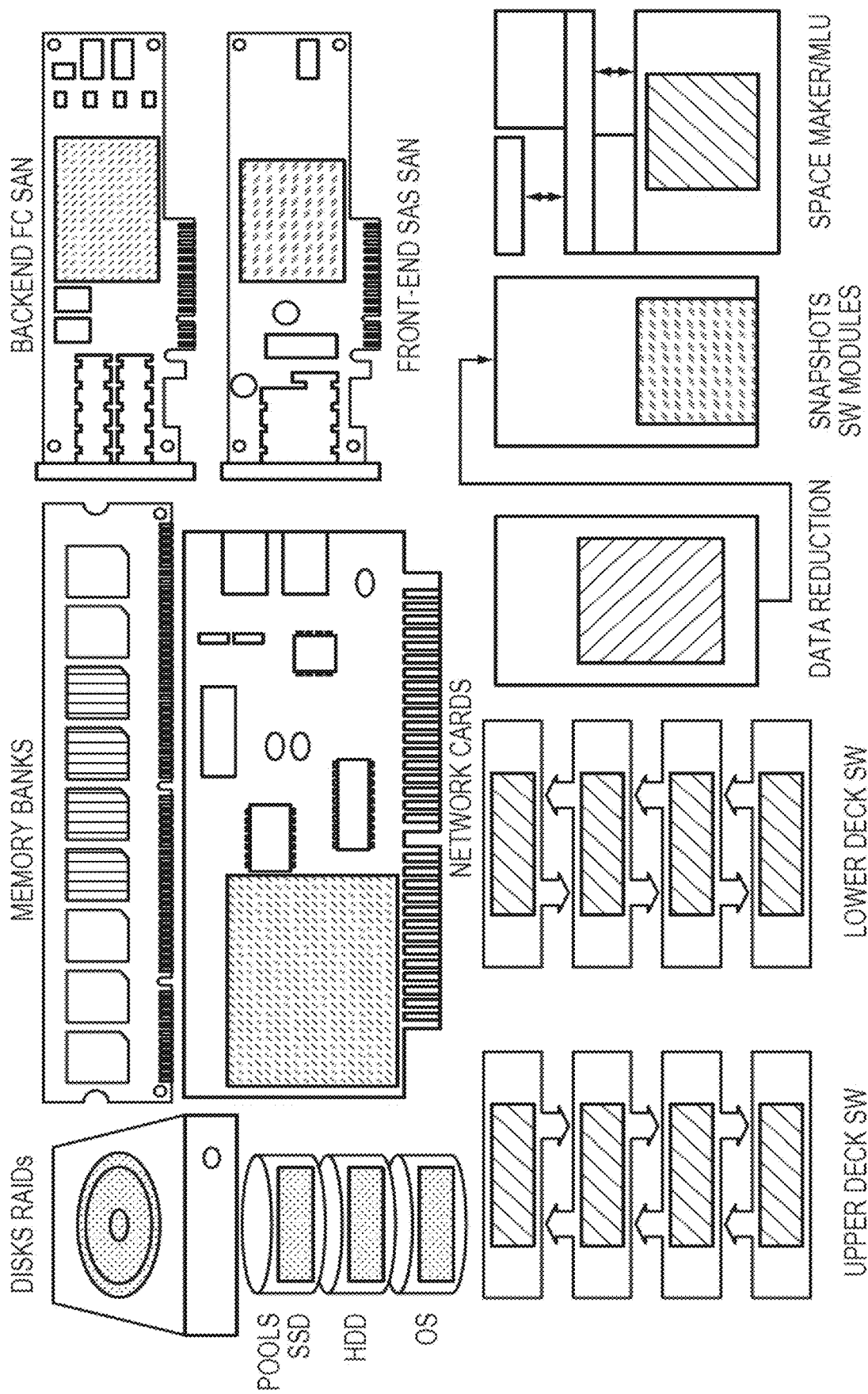
FIG. 5 illustrates a bitmap of objects of a healthy storage system, in accordance with an embodiment of the present disclosure.

FIG. 5 illustrates bitmap objects of a healthy storage system, in accordance with an embodiment of the present disclosure. In an example embodiment, components in the storage system are represented within a graphical user interface as bitmap objects. The bitmap objects may be rendered as a particular color to indicate a particular component, or may be rendered as a particular shape. The visual representation of the components within the storage system make it easy and intuitive to assess the health of the storage system. FIG. 5 illustrates a "healthy" storage system, meaning no malfunctions have been detected.

Figure 6:
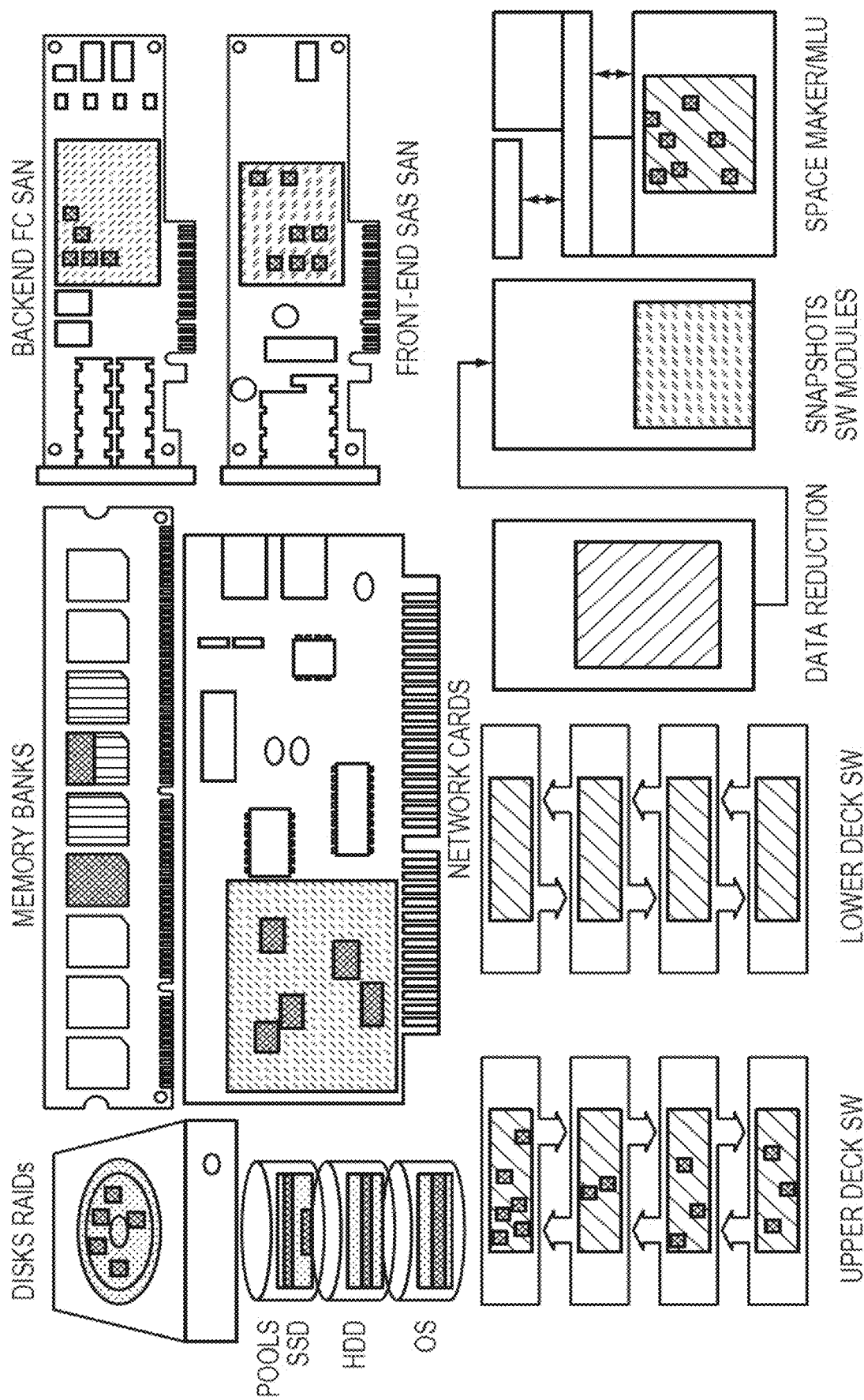
FIG. 6 illustrates a bitmap of objects of a faulty storage system, in accordance with an embodiment of the present disclosure.

FIG. 6 illustrates bitmap objects of a faulty storage system, in accordance with an embodiment of the present disclosure. For example, the "Disks Raids" depicted as "healthy" in FIG. 5, are depicted as "unhealthy" in FIG. 6, with red colored components in the depicted "Disks Raids" image. In an example embodiment, faulty components may be depicted with a color that represents a malfunction, and the shade of that color may change (or a different color may be used) depending on a threshold associated with the malfunction. In an example embodiment, the method distinguishes between the different colors and the different shades of colors to identify malfunctions and/or levels of malfunctions. In another example embodiment, shapes may be used to represent faulty versus functioning components. It should be noted that any type of visual representation may be used to indicate a difference between functioning and faulty components.

Figure 7:
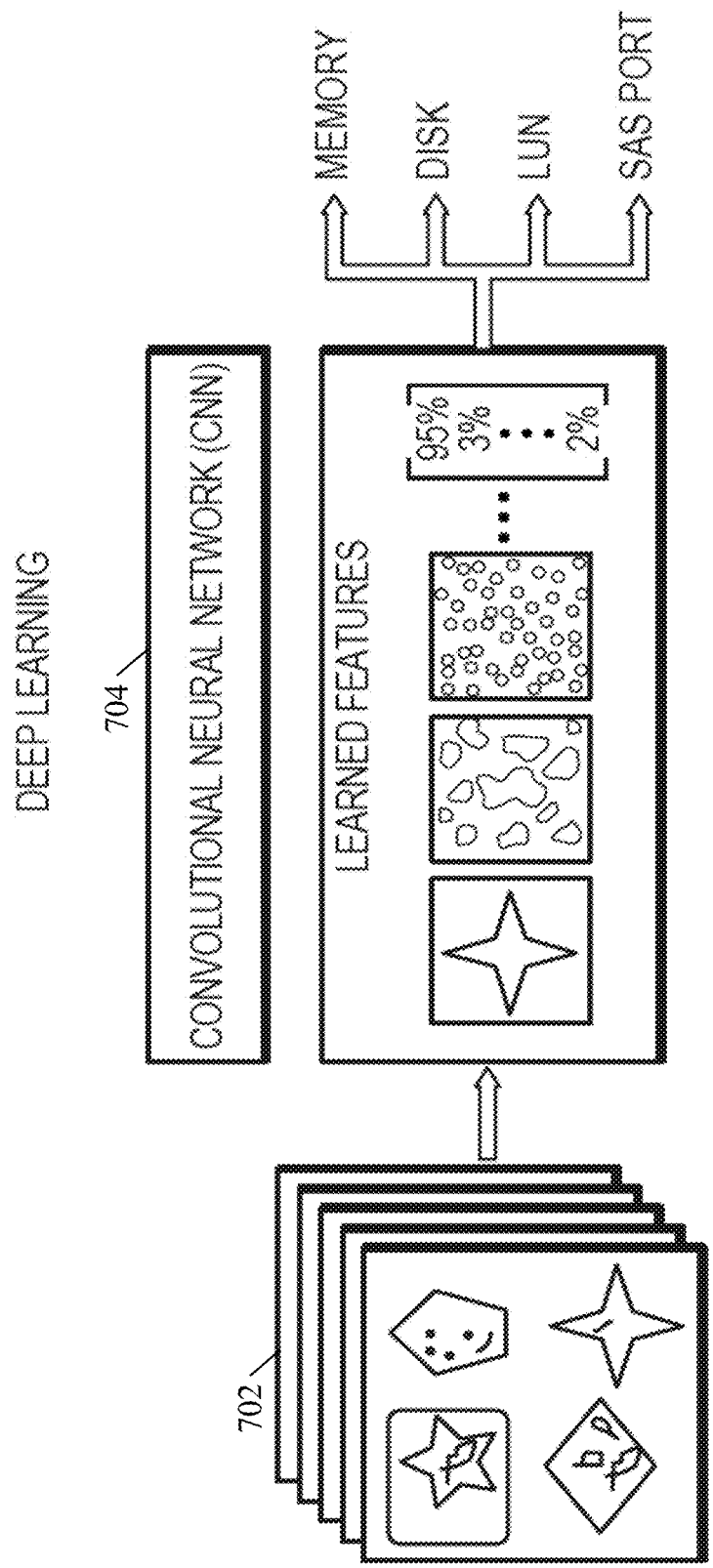
FIG. 7 illustrates a deep learning Convolutional Neural Network configuration approach to training the machine learning system using the bitmap image, in accordance with an embodiment of the present disclosure.

FIG. 7 illustrates a deep learning Convolutional Neural Network configuration approach to training the machine learning system using the bitmap image, in accordance with an embodiment of the present disclosure. In an example embodiment, the machine learning system is trained within a cloud based environment, allowing the machine learning system to train on large amounts of data gathered from multiple customers, where the large amounts of data comprise at least a few thousand types of malfunctions. In the example illustrated in FIG. 7, a plurality of bitmap images 702 are used as input to train a Convolutional Neural Network 704, and the output is a graphical user interface depicting a health assessment of a storage system. The output may be, for example, as illustrated in FIG. 5 and FIG. 6. In another example embodiment, the machine learning system executes within a cloud based environment.

Figure 8:
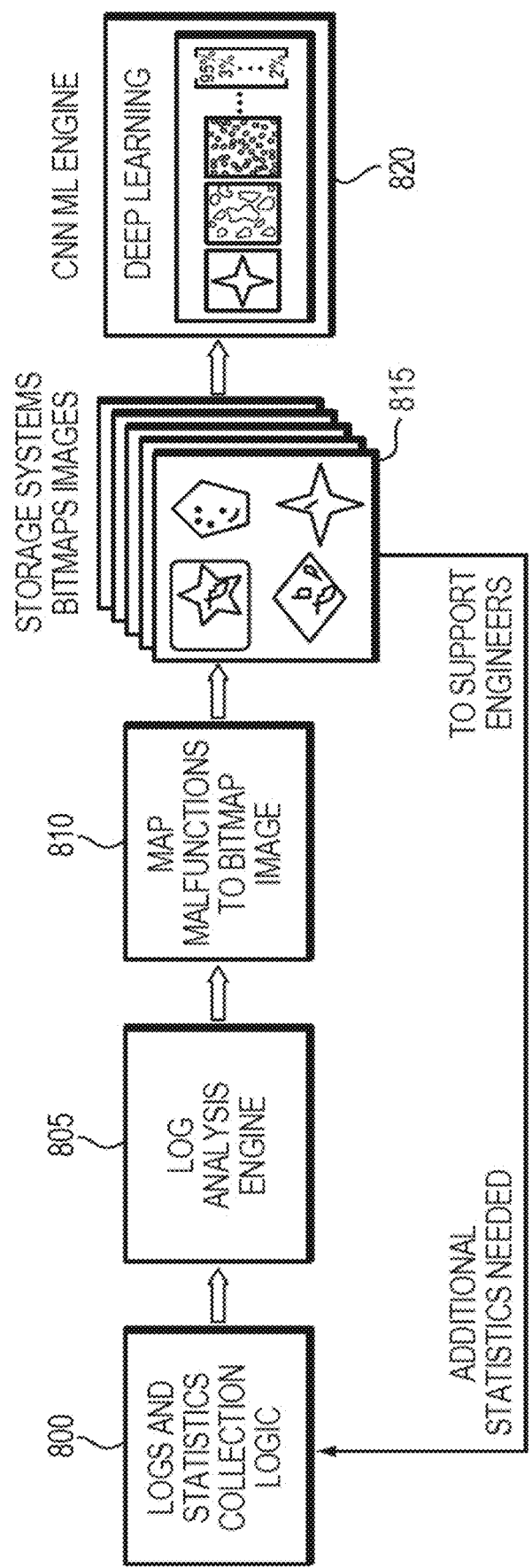
FIG. 8 illustrates mapping the text messages in the event logs to a bitmap image, in accordance with an embodiment of the present disclosure.

FIG. 8 illustrates mapping the text messages in the event logs to a bitmap image, in accordance with an embodiment of the present disclosure. In an example embodiment, data such as logs and statistics are gathered in a storage system using, for example, the Logs and Statistics Collection Logic 800. For example, storage systems have advanced mechanisms for detecting malfunctions of software and hardware by collecting logs and statistics related to the operation of the storage system. In one example embodiment, the logs and statistics are collected using a cloud based management application. The method uses a Log Analysis Engine 805 to analyze the data, and map the malfunctions identified within the logs. The method creates a bitmap image, and maps the malfunctions to bitmap pixels in the bitmap image 810. The bitmap image is the result of the analysis performed on the logs and statistics. In an example embodiment, a bitmap image is created for each hardware platform, and each new release, creating multiple bitmap images 815. The bitmap image is used as input to the machine learning system, for example a Convolutional Neural Network (CNN) Machine Learning (ML) engine 820. The CNN accepts images as input. In an example embodiment, the CNN preprocesses the images prior to their input into the machine learning system. In an example embodiment, additional statistics may be provided, for example, from customer support historical data from reported malfunctions.

Figure 9:
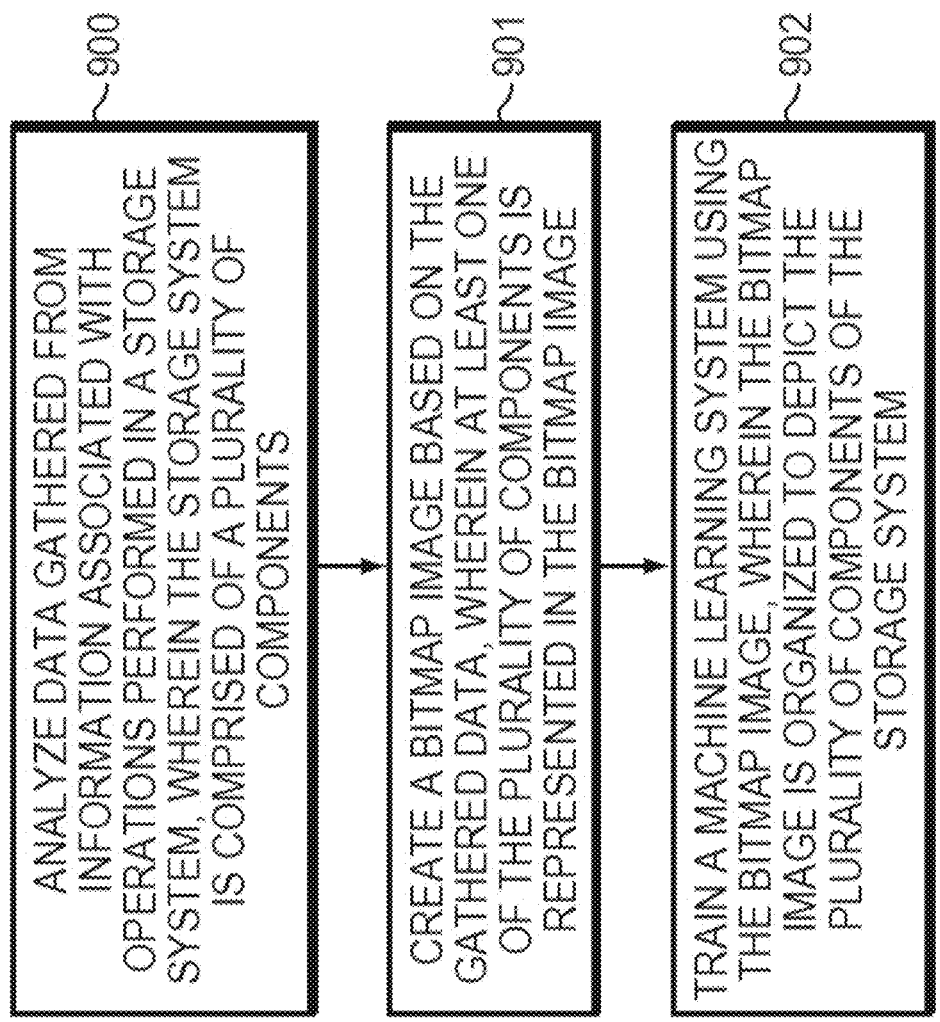
FIG. 9 is a flow diagram illustrating processes that may be used in connection with techniques disclosed herein.

Referring to FIG. 9, shown is a more detailed flow diagram illustrating analyzing a storage system using a machine learning system. With reference also to FIGS. 1-8, the method analyzes data gathered from information associated with operations performed in a storage system, where the storage system is comprised of a plurality of components (Step 900). In an example embodiment, the data gathered from information associated with operations performed in the storage system is gathered by using a cloud based management application. In another example embodiment, the information associated with the operations performed in the storage system includes at least one of event logs and statistics gathered from the plurality of components of the storage system upon detection of a malfunction in at least one component of the plurality of components. In an example embodiment, storage systems have advanced mechanisms for detecting malfunctions of software and hardware by collecting logs and statistics related to the operation of the storage system. For example, when a malfunction of a software module is detected by the storage system forensic tools, additional statistical data is collected. This results in a large amount of statistical data collected. In an example embodiment, the data is collected and stored in a cloud based environment. In an example embodiment, the method analyzes the data gathered, for example, by searching for keywords in the logs and statistics that indicate malfunctions, and/or faulty components. The method may determine the location of the malfunction, type of malfunction, value of the malfunction, severity of the malfunction, etc. In an example embodiment, the method creates a bitmap image based on the gathered data, where at least one of the plurality of components is represented in the bitmap image (Step 901). The bitmap image is the result of the analysis on the gathered data. In essence, the bitmap image is a visualization of the health of the storage system based on gathered data, for example, the logs and statistics.

In an example embodiment, the method trains a machine learning system using the bitmap image, where the bitmap image is organized to depict the plurality of components of the storage system (Step 902). In an example embodiment, the method trains a machine learning system to analyze, in a cloud based environment, the bitmap image to detect the difference between occurrence of at least one of malfunctions in the storage system and normal functioning of the storage system. In an example embodiment, the input to the machine learning system is the bitmap image created from the logs. In an example embodiment, the machine learning system is trained using data collected from different hardware platforms, and different versions of software, as well as using customer support historical data from reported malfunctions. In an example embodiment, bitmap objects representing components in the storage system are created from the data collected during the Quality Assurance testing performed for each platform, and release. The machine learning system is trained to learn normal versus faulty behavior in the storage system. In an example embodiment, errors may be intentionally included during the Quality Assurance testing to further train the machine learning system. In an example embodiment, the output of the machine learning system are bitmap objects that represent the hardware and software components of the storage system. The bitmap objects are rendered in a graphical user interface where customer service engineers, for example, can intuitively assess the health of a storage system. In an example embodiment, customer support engineers are trained to detect malfunctions in the storage system by inspecting the bitmap objects depicted within the graphical user interface instead of manually searching through the logs and statistics to detect the source of malfunctions in the storage system.

The bitmap objects are represented according to the "health" of each component. For example, a disk can be represented as a healthy disk, or a faulty disk, depending on the depiction of the bitmap object that represents the disk. For example, a healthy disk may be represented as a purple disk object. A faulty disk may be represented as a purple disk object with red identifiers, where the red identifiers indicate detected malfunctions associated with the disk. In an example embodiment, the position of, for example, red identifiers on a component in the storage system, may indicate where, within that component the malfunction occurred. In an example embodiment, the historical data from reported malfunctions are used to train the machine learning system to associate the malfunctions detected in the information gathered with the bitmap objects, and to further refine the output of the machine learning system to depict a bitmap object that indicates a healthy or faulty component depending on the data. In an example embodiment, the method creates a catalog of component images, and matches the images to a malfunction type and a bitmap object in the bitmap image. In an example embodiment, with each new release of a software or hardware components of a storage system, the machine learning system is retrained by adding all the newly reported malfunctions that were recorded since the previous release of such components.

In an example embodiment, the machine learning system detects a malfunction attributed to at least one component of the plurality of components depicted in the bitmap image by analyzing the bitmap image. In an example embodiment, the method detects a change between the bitmap image and a second bitmap image created from a different set of data (for example, a bitmap image created at an earlier point in time). In an example embodiment, the detected malfunctions are learned by the machine learning system as the machine learning system trains on a collection of bitmap images. In an example embodiment, the machine learning system learns to detect different malfunctions of different hardware and software components of a bitmap image using many hidden layers with each hidden layer increasing the complexity of the learned bitmap image features. For example, a first hidden layer detects a shape of a bitmap object. A second hidden layer detects different shades of a particular color, where the different shades each indicates a different faulty notification. Another hidden layer, for example, detects more critical malfunctions by detecting blocks made of multiple pixels. Yet another hidden layer detects more complex interactions between log objects, and/or detect complex related errors found in customer support historical data from reported malfunctions. In an example embodiment, the machine learning system identifies in the logs and statistics day and time of the log, system name, storage processor from which a log message was received, component from which a log message was received, user application and server running IO from which the storage process message was received, severity of the log message, source of health error/type of log (for example, "System", "Audit", "User", etc.), sub-component from which the log message was received, etc. In another example embodiment, the method trains the machine learning system to detect at least one of a bitmap object shape, a bitmap object edge, a plurality of pixels, a color associated with at least one pixel in the bitmap image, and at least one interaction between the plurality of components in the storage system.

In an example embodiment, the method modifies a representation of at least one component of the plurality of components in a graphical user interface to indicate the detected malfunction. For example, when a disk failure occurs, the method changes a pixel in the bitmap image to a different color, for example, "red", to indicate a component failure. In an example embodiment, the RAID that comprises the faulty disk also turns a different color, for example, "amber", when more than two disks malfunction. In another example embodiment, the RAID that comprises the faulty disk will turn a different color, for example, "red", when a second disk fails during a rebuild of a disk. Thus, the customer support engineers can quickly identify from the bitmap image, a faulty component when the fault is detected by the machine learning system; a picture is worth a thousand words.

In an example embodiment, when the method creates the bitmap image based on the gathered data further, the method depicts each component of the plurality of components as a bitmap object in the bitmap image. Each bitmap object has a different shape and is associated with a different sized pixel based on an importance associated with the each component in the storage system. In an example embodiment, IO ports of each storage processor may be depicted as one size of pixels, but the management and communication ports that may create data loss if a storage processor fails are depicted with pixels larger than the pixel size used for the IO ports.

In an example embodiment, the method trains the machine learning system to analyze the bitmap image to detect the difference between occurrence of malfunctions in the storage system and/or normal functioning of the storage system. In an example embodiment, during the training of the machine learning system, each bitmap object represents a different area of the hardware and/or software components to make it easier and faster to detect when the bitmap object changes color and/or shape. FIG. 5 illustrates bitmap objects of a healthy storage system, while FIG. 6 illustrates bitmap objects of an unhealthy storage system, where the components in the storage system that have malfunctioned are depicted as red identifiers within those components. The depictions in FIG. 5 and FIG. 6, also facilitate identifying different components, for example, the disks versus the memory banks. These depictions make it easy for a customer service engineer to quickly identify a malfunction, quickly identify the location of the malfunction, and/or the severity of the malfunction.

There are several advantages to embodiments disclosed herein. The method provides a visual representation of the components in a storage system along with an indication of the health status associated with each component, identifying malfunctions within components, identifying the location of the malfunctions, and identifying a severity associated with the malfunction. The method discerns between changes in an application workload versus a hardware and/or software malfunction. The method drastically reduces the time required to detect and resolve malfunctions that occur in a storage system. The method incorporates previously detected malfunctions into machine learning system in order to identify such malfunctions efficiently in new releases of hardware or software components of a storage system, facilitating sharing acquired knowledge among customer service engineers. The method eliminates the need to interpret logs to identify malfunctions.

Described above are techniques that may be used to detect various states of health and malfunction with respect to components of a data storage system. Such techniques may use a trained first neural network to detect the various states of health and malfunction where the first neural network is provided an image of the various components. Each of the different components may be represented by an associated element of the image. The different elements of the image corresponding to components experiencing malfunctions, faults, failures and the like, may be populated with information denoting the particular detected malfunctions, faults, failures, and the like. For example, as discussed above, a detected fault of a particular component may be denoted by a shaded or colored element representing the component in the image. The shading and/or the particular color may denote the fault.

In this manner, the first neural network as described above may be trained to detect and recognize various faults or failures of different system components. It may be desirable to further detect smaller changes in system behavior that may provide an earlier indication of such potential failures, faults and malfunctions such as before the failure actually occurs or prior to the system or component otherwise reaching a critical state rendering the component or system unusable. Thus, in at least one application, the first neural network as described above may be trained to detect major faults or large state changes with respect to the system and its components. As such, described in following paragraphs are techniques that may be used to further improve upon the first neural network detection of the major faults or state changes by further providing for detection of smaller or incremental state changes. In one aspect, the smaller or incremental state changes may be characterized as one or more sub-steps, sub-phases or sub-states, or generally intermediate states, that are expected to progressively result in the major fault or state change detected by the first neural network. In at least one embodiment, the sub-states or progression of intermediate states may be characterized as incremental varying smaller degrees of severity of error, unhealthiness or fault. For example, such smaller sub-states or intermediates states may corresponding to low, medium and high levels of warning prior to the occurrence of the major fault or state change.

In at least one embodiment, the techniques in following paragraphs provide for obtaining a representation of the internal state of the first neural network after the first neural network has processed an input image denoting one of the smaller intermediates states or sub-states. The input image denoting the smaller intermediate state or sub-state does not cause the first neural network to detect the major fault or major state change. However, despite the first neural network not detecting the major fault, the internal state of the first neural network still experiences changes or differences denoting some degree of unhealthiness, error or fault in response to processing the input image denoting the smaller sub-state or intermediate state. The representation of the internal state of the first neural network is then provided as an input to a second neural network. Based on the representation of the internal state of the first neural network, the second neural network detects the smaller sub-state or intermediate state denoted by the input image even though the first neural network has not yet detected the major fault or state change. The representation of the internal state of the first neural network is analyzed by the second neural network whereby small variations or changes in the internal behavior of the first neural network nodes denotes the smaller sub-states. In at least one embodiment, the internal state of the first neural network may include the weights of the inputs to the nodes or neurons of the one or more hidden layers and the output layer of the first neural network. The internal state of the first neural network may be in the form of an image representing the values of the weights. The image representing the values of the weights of the internal state of the first neural network may be provided as the input to the second neural network. The image denoting the internal state of the first neural network may also be visually represented to a user.

Figure 10:
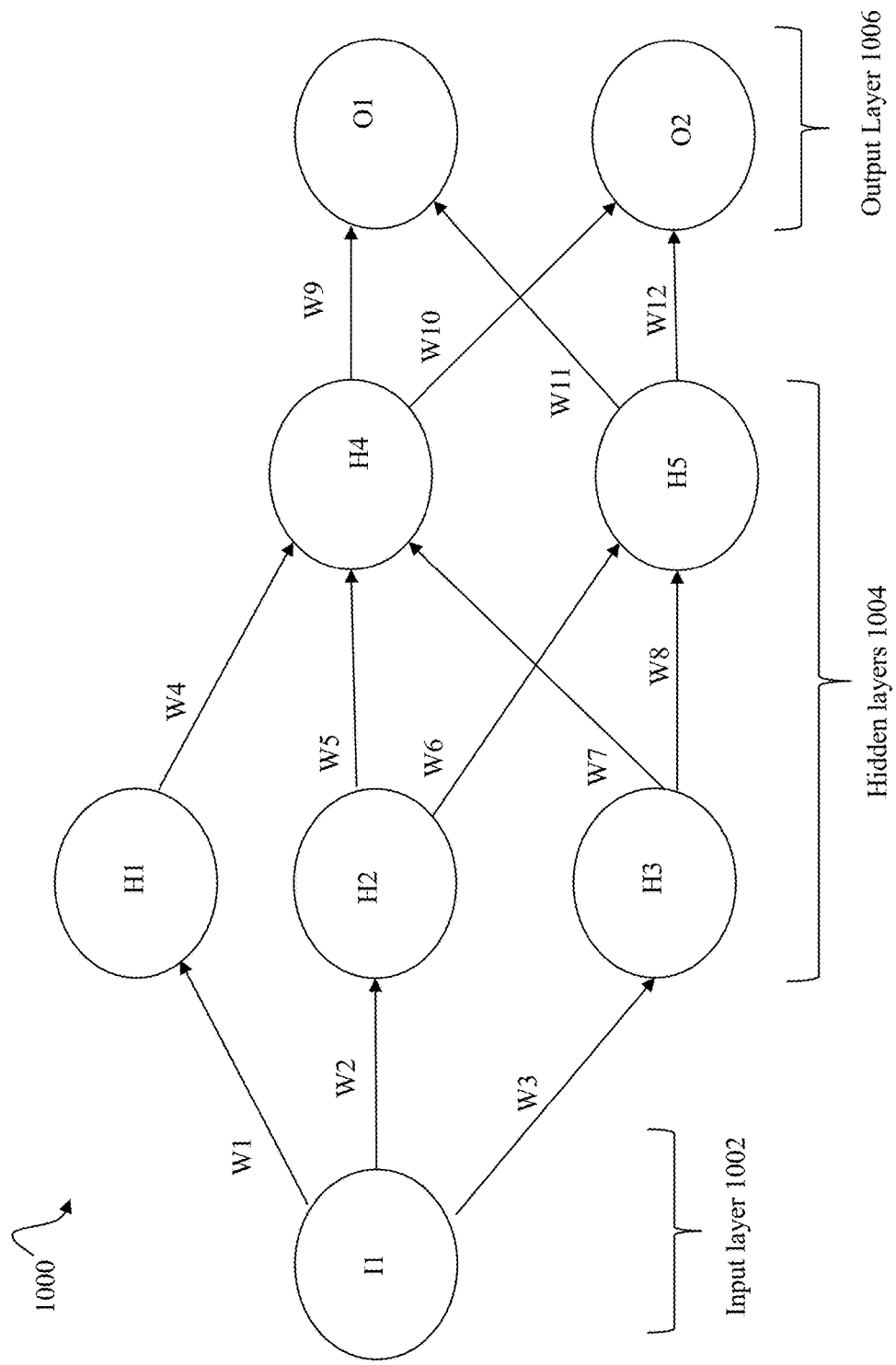
FIG. 10 is an example of a neural network that may be used in an embodiment in accordance with the techniques described herein.

Referring to FIG. 10, shown is an example of a neural network that may be used in an embodiment in accordance with the techniques herein. The example 1000 provides additional detail regarding the neural network described above, such as, for example, in connection with FIGS. 3, 4, 7 and 8 above. The example 1000 provides additional detail regarding a neural network that may be used as the first and/or second neural network in connection with the techniques described herein.

The example 1000 includes input layer 1002, hidden layers 1004 and output layer 1006. Consistent with other discussion herein, an input is provided to the input layer 1002 of the neural network 1000 where the input passes through multiple hidden layers 1004 and outputs a prediction, as denoted by the one or more output nodes of the output layer 1006. Each of the layers 1002, 1004 and 1006 includes one or more nodes also referred to as neurons. Each node is a different neuron. The example 1000 includes an input layer layer 1002 with a single input for purposes of simplifying the illustration. However generally each of the layers of 1002, 1004 and 1006 may include any number of nodes or neurons. Additionally, there may be one or more hidden layers 1004. In the example 1000, the input layer includes neuron I1; the first hidden layer includes nodes H1, H2 and H3; the second hidden layer includes nodes H4 and H5; and the output layer includes nodes O1 and O2.

Connections or synapses are shown between pairs of nodes. In the example 1000, each connection or synapse is denoted by an arrow from an output node or neuron of one layer to an input node or neuron of another layer. Each connection or synapse "i" also has an associated weight, denoted as Wi, "i", being a non-zero integer. In the neural network 1000, there are 12 connections or synapses between pairs of nodes where weights of the 12 connections are denoted as W1-W12, inclusively. The particular weight Wi associated with a particular connection from a first node to a second node denotes that the output of the first node is weighted when provided as an input to the second node.

In an embodiment in accordance with techniques herein with respect to the first neural network described herein, the weights W at a point in time denote an internal state of the neural network at the point in time. When the neural network is in training mode, as discussed in more detail elsewhere herein and an input is provided to the neural network, one or more of the weights W may be modified or adjusted as optimal values for the weights W are learned in order to accurately predict the outputs of layer 1006. Thus, the neural network of the example 1000 may be provided an input during training whereby one or more of the 12 weights W1-W12 may be adjusted in response to processing the input. In connection with techniques herein, when the first neural network discussed above is the neural network of FIG. 10, processing may capture or extract the internal state of the first neural network as denoted by the particular values of the 12 weights W1-W12 after the input has been processed. As discussed in more detail below, the input may be particularly selected, for example, to be one of the sub-states or intermediate states.

Figure 11:
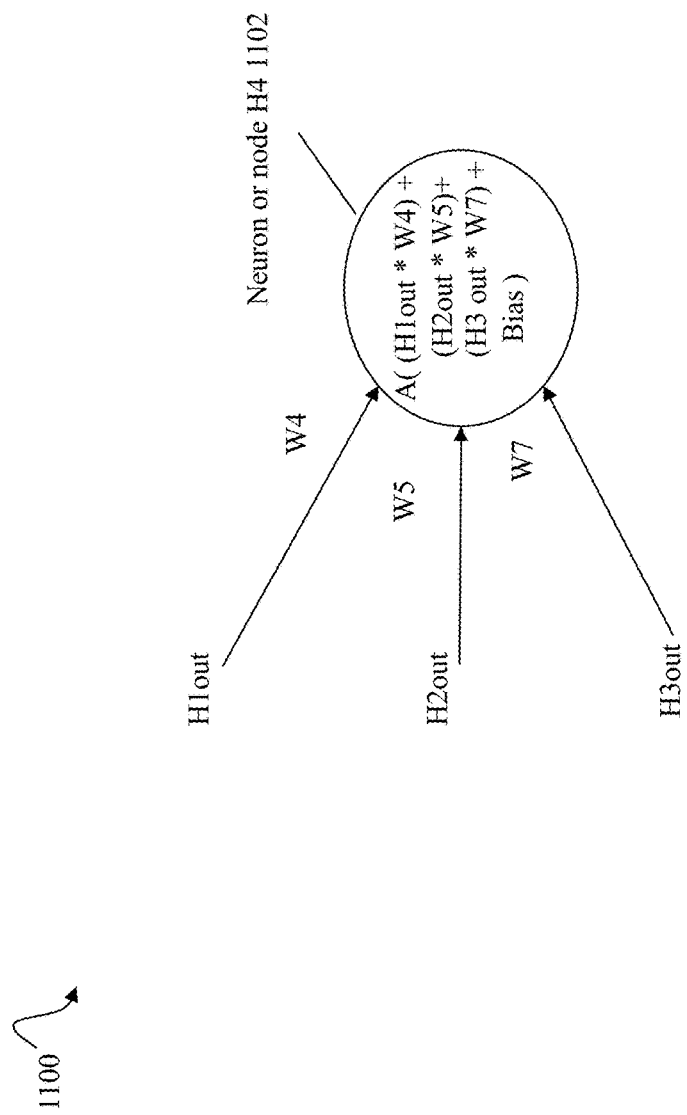
FIG. 11 illustrates a neuron of FIG. 10 in more detail.

Referring to FIG. 11, shown is an example illustrating in more detail a particular neuron of the network from FIG. 10 that may be used in an embodiment in accordance with the techniques herein. The example 1100 provides further detail about the single node or neuron H4 1102 from FIG. 10. However, other neurons of the hidden layers 1004 and output layer 1006 also have similar weighted inputs and activation functions as discussed below.

Each neuron in the layers 1004, 1006 combines one or more weighted inputs, applies an activation function A, and returns an output which is the output signal from the neuron to one or more other neurons. For example, neuron H4 1102 is in the second hidden layer of 1004 of FIG. 10 and has 3 inputs from 3 neurons H1, H2 and H3 of the first hidden layer of 1004. The output from neuron H1 is denoted as H1out, the output from neuron H2 is denoted as H2out and the output from neuron H3 is denoted as H3out. Each of the 3 outputs H1out, H2out and H3out are weighted, respectively, by corresponding synaptic weights W4, W5 and W7. The weight of a connection, such as W4, is applied to the output of one neuron (e.g., H1) that is an input to another neuron, such as H4 1102. In the neuron 1102, the activation function is denoted by the "A" which applies the activation function "A" to the sum of the weighted inputs to node H4. In the node H4 1102, the weighted sum of the inputs is (H1out*W4)+(H2out*W5)+(H3 out*W7). Additionally shown is a bias value, Bias, that may be added to the weighted sum of the inputs calculated at each node (except the input layer nodes) during the feed-forward phase.

When a neural network is trained, such as the first neural network discussed above, to recognize the major faults, the weights and bias values of the neurons are learned and may be adjusted during the training process in order to find optimal values for the weights and bias values of the neurons to enable accurate prediction of the desired outputs for particular corresponding inputs.

Figure 12:
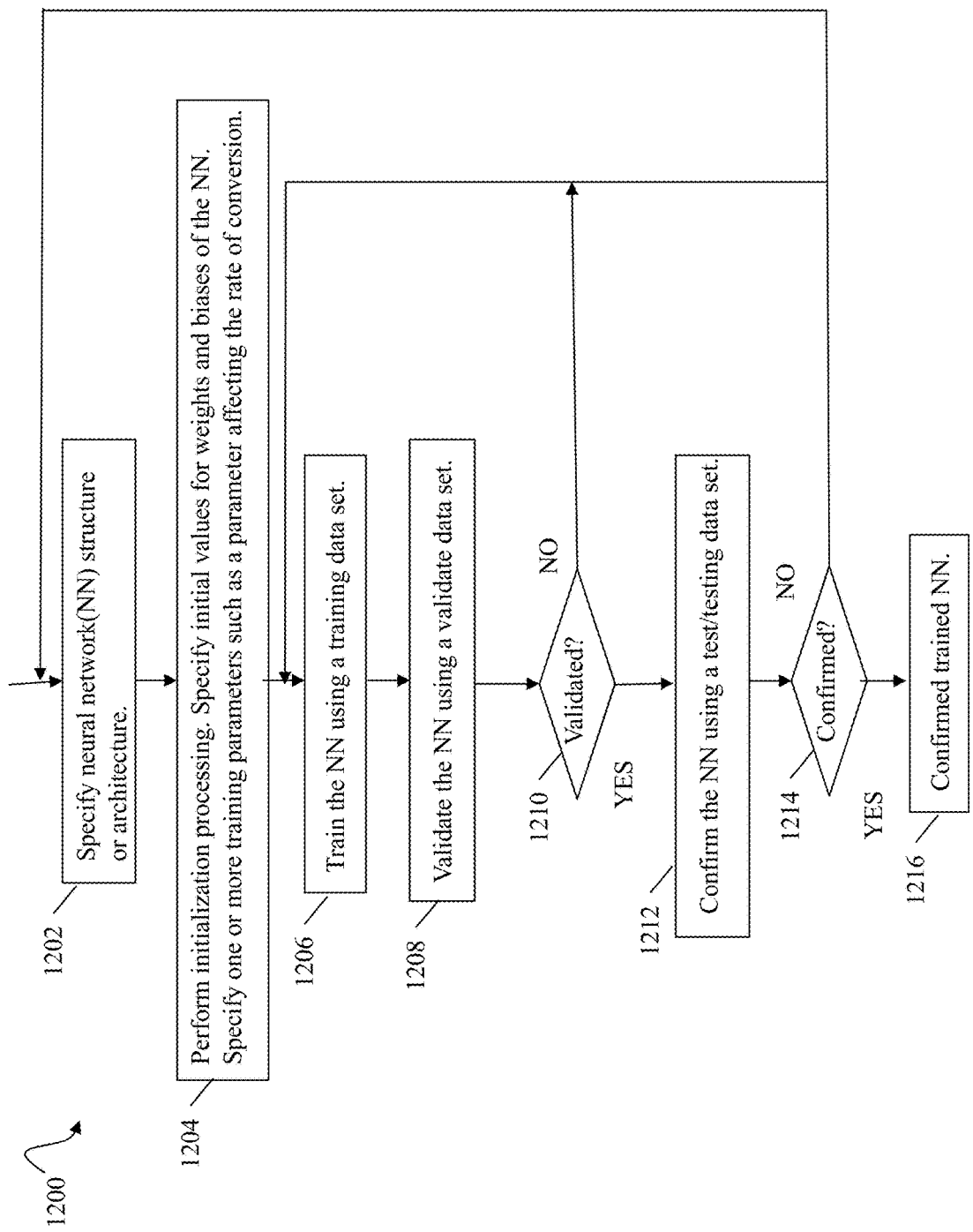
FIGS. 12, 19A, 19B and 20 are flowcharts of processing steps that may be performed in an embodiment in accordance with the techniques herein.

What will now be described is general processing that may be performed to obtain a final model of a machine learning system. In at least one embodiment, the model of the machine learning system may be a neural network as described herein. Generally, building the final neural network or model is obtained as a result of performing an overall process described below with reference to the FIG. 12. The processing described in connection with FIG. 12 may be performed in connection with training the first and the second neural network in an embodiment in accordance with the techniques herein.

As a first step 1202, the neural network structure or arrangement is determined based on parameters, sometimes referred to as hyper-parameters that define the neural network architecture. The hyper-parameters may include, for example, determining a number of hidden layers in the neural network, the number of neurons in each of the layers (e.g., input layer, hidden layers and output layer), determining the synapses or connections between neurons of the different layers, and selecting an activation function used by the neurons.

Once the step 1202 has completed, control proceeds to an initialization step 1204. The step 1204 may be performed prior to training the neural network using a training data set. The initialization processing of the step 1204 may include specifying initial values for a second set of neural network parameters that are tuned, adjusted or "learned" during training. For example, initial values may be specified for the weights applied to the synaptic connections or inputs to the neurons. Initialization may also provide initial bias values of the second set. Additionally, values may be specified for one or more other parameters affecting the neural network training. For example, one or more training parameters may be specified that affect the rate of convergence or learning rate.

Once the initialization processing of the step 1204 has completed, control proceeds to the step 1206. At the step 1206, the neural network training may be performed using the training data set. During training of the step 1206, the weights of the synapses or connections between neurons are tuned or modified with the general goal of minimizing a cost or loss function. During training, the bias values of the neurons may also be similarly tuned or adjusted. The neural network may be trained, for example, using a supervised learning method such as gradient descent or other suitable technique known in the art. The training data set may include sets of input data provided as input to the neural network. For each input vector or set of input data, such as a bitmap image described above, the training data set also includes a corresponding output data set or vector denoting the expected or correct output result that a properly trained neural network should output (for the corresponding input data). The current neural network model is run using the input data of the training data set and produces a result. The result generated by the neural network during the training is then compared to the expected output of the training dataset. Based on the result of the comparison and the specific learning algorithm being used, the parameters of the neural network model are adjusted. For example, as noted above, such adjustments may be made to the neural network weights and bias values. The model fitting can include both variable selection and parameter estimation.

Once the training step 1206 has completed, control proceeds to the step 1208. At the step 1208, validation processing may be performed. During validation, the weights and bias values are not being adjusted. Rather, validation processing is generally evaluating the predictive capabilities of the current neural network model using the weights and bias values resulting from the training. The validation processing of the step 1208 may include performing neural network validation using a second data set often referred to as the validation data set. The validation data set is different than the training data set and is used to provide an unbiased evaluation of the current neural network resulting from completion of the training using the training data set. The validation data set may be similar in structure and form to the training data set described above. The validation data set may include sets of input data provided as input to the neural network. For each input vector or set of input data, such as a bitmap image described above, the validation data set also includes a corresponding output data set or vector denoting the expected or correct output result that a properly trained neural network should output (for the corresponding input data). The current neural network model is run using the input data of the validation data set and produces a result. The result generated by the neural network during the validation is then compared to the expected output of the validation data set. The fitness or goodness of the current neural network model may be evaluated, for example, using an error function and the result of the comparison (e.g., of the result generated by the neural network during the validation to the expected output of the validation data set). For example, the error function may generate a measured error rate obtained based on the result of the comparison. If the measured error rate is not below a specified threshold, for example, the training and validation processing of the neural network may be repeated any one or more times as needed to obtain a trained neural network that meets the specified threshold or other criteria. Validation datasets may also be used for regularization by early stopping. For example, an embodiment may stop training the neural network when the error rate obtained using the validation dataset increases, as this is a sign of possibly overfitting to the training dataset. More generally, one or more stopping criteria may be specified to indicate when to stop training the neural network whereby the neural network may be considered the final neural network model.

Thus, as illustrated in the flowchart 1200, once validation processing of the step 1208 has completed, control proceeds to the step 1210 where a determination is made as to whether the neural network may be considered validated meeting any specified criteria such as noted above. If the step 1210 evaluates to no, control returns to the step 1206 where the processing of training and validating is again repeated. If the step 1206 evaluates to yes whereby the neural network has been successful validated, control proceeds to the step 1212.

In the step 1212, the final neural network model may be evaluated using a test dataset to provide an unbiased evaluation of a final neural network model. The test data set may be unique in comparison to the training and validation data sets. The test dataset is used to confirm the acceptable predictive capabilities of the final neural network model. The final neural network model may be evaluated using the test data set in a manner similar to that as described above with the validation data set whereby a resulting error rate may be obtained. In at least one embodiment, criteria may be specified where the error rate obtained with the test data set may be compared with the prior error rate obtained from the last evaluation of the neural network model with the validation data set. In at least one embodiment, the validity of the final neural network model may be confirmed if the error rate obtained with the test data set does not exceed the prior error rate obtained from the last evaluation of the neural network model with the validation data set by more than a specified threshold. If the validity of the final neural network model is not confirmed, one or more actions may be taken. The one or more actions may include, for example, repeating the training and validation as described above. The one or more actions may include further evaluating the neural network model to try an alternative neural network model structure, arrangement or architecture by modifying one or more of the hyper-parameters (e.g., return to the first step as described above).

Thus, once the step 1212 has completed, control proceeds to the step 1214 where a determination is made as to whether the neural network confirmation was successful. If the step 1214 evaluates to no, control may return to the step 1202 or the step 1206 depending on the particular action(s) taken, as discussed above. If the step 1214 evaluates to yes, control proceeds to the step 1216 where processing has successfully confirmed that the neural network is now a trained neural network.

Generally, any suitable technique and criteria may be used to train and evaluate a neural network model and obtain the data sets utilized in connection with processing of the flowchart 1200. Once the final neural network model has been generated as a result of training and confirmed (e.g., step 1216) as meeting any specified criteria used in connection with evaluation (e.g., criteria used with evaluating the neural network in connection with the validation processing and confirmation using the test data set), the final neural network may be characterized as a trained neural network having the particular weights and bias values selected as a result of such processing. The trained neural network may then be used to predict subsequent outputs based on specified inputs.

The trained neural network may be defined by its hyper-parameters denoting its structure or architecture as noted above. The trained neural network may also be defined by a first set parameters that are learned through the process described above. The first set of parameters may include the bias values and weights determined through the training, validation and confirmation processing of the neural network described above. Thus, at a first point in time the trained neural network with the first set of parameters may be used to predict outputs based on specified inputs.

Subsequent to the first point in time, the trained neural network may be further trained or retrained, for example, to recognize or predict additional or different outputs. Such retraining may be performed as described above using additional data sets. After such retraining at a second point in time whereby the resulting predictive performance of the neural network is again validated and confirmed meeting any specified criteria, the trained neural network may be defined by its hyper-parameters as well as an updated or revised set of parameters associated with learning to predict the additional or different outputs. The revised set of parameters at the second point in time may include an updated set of weights and bias values where one or more of these values may have been updated in comparison to those of the first set. Generally, the trained neural network may be subsequently retrained any number of times.

When the neural network is being trained or retrained, processing is performed to tune, adjust and select values for the weights and biases that optimize the ability of the neural network to predict outputs given particular inputs. Thus during training and retraining, one or more of the weights and bias values may be updated (e.g., in comparison to prior values or starting values of the weights and biases prior to training or retraining). Once a particular set of weights and bias values used with a neural network has been validated and confirmed as meeting any specified criteria, the neural network may be characterized as a trained neural network with the particular weights and bias values.

The trained neural network may be used in a non-training or non-learning mode where the particular weights and bias values are fixed and not adjusted. In this non-training or non-learning mode, the trained neural network is used to predict outputs based on specified inputs without further modifying any of its weights and bias values.

Figure 13:
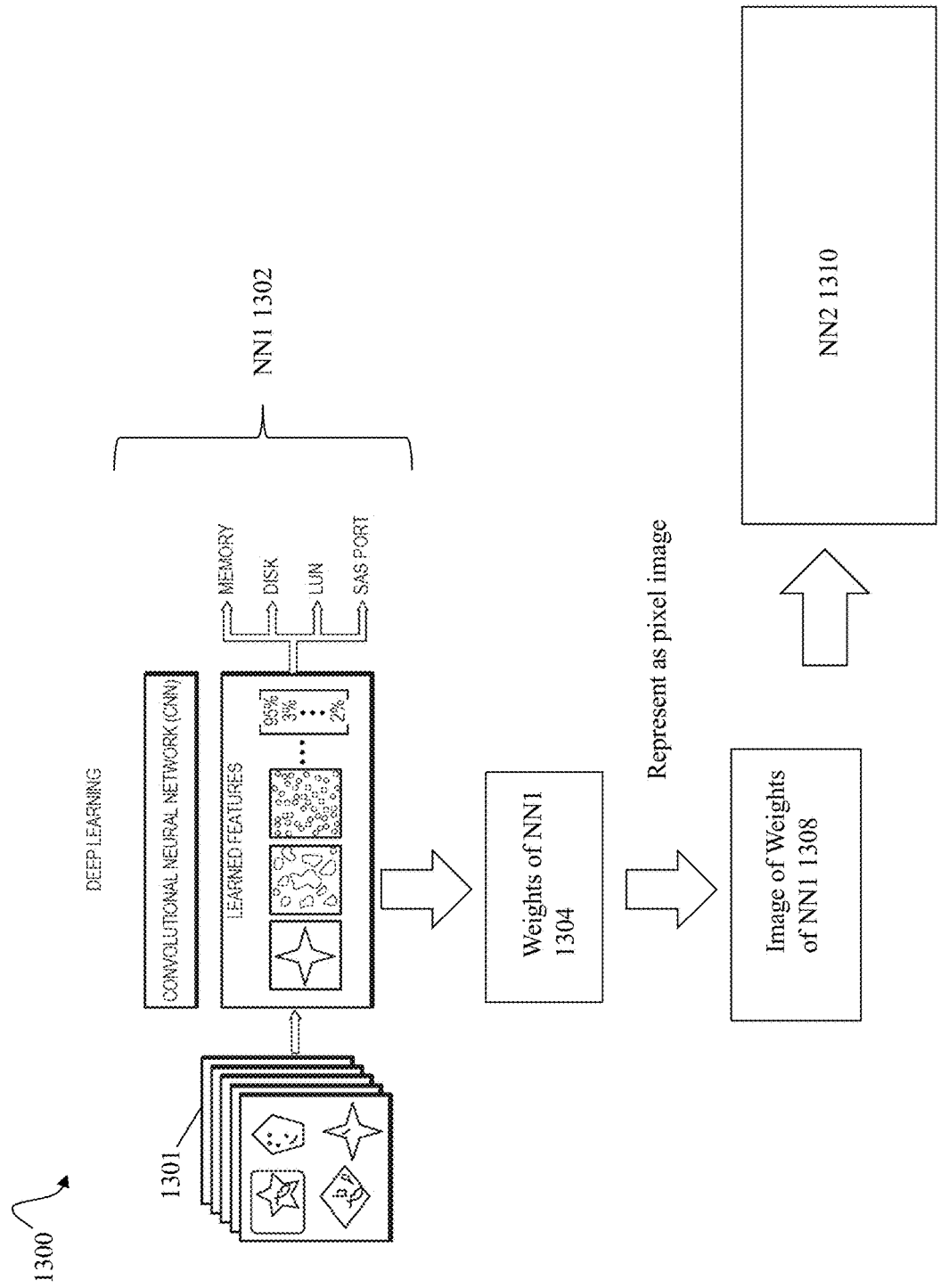
FIG. 13 illustrates data flow between components in an embodiment in accordance with the techniques herein.

Referring to FIG. 13, shown is an example illustrating components in an embodiment in accordance with the techniques herein. In the example 1300, the first neural network, NN1 1302, may be trained as described above to recognize major faults or malfunctions in the system. The NN1 1302 may be as described above, for example, in connection with the FIGS. 7 and 8. Subsequently, NN1 1302 may then be placed in training mode again. Generally, as noted elsewhere herein, when in training mode the NN1 1302 may be in a phase of processing where its weights and bias values are being adjusted and learned, such as in the training phase or step (e.g., step 1206 of FIG. 12) and validation phase or step (e.g., step 1208 of FIG. 12) While NN1 1302 is in training mode being trained, one or more various images 1301 may be provided as inputs to NN1 1302. In at least one embodiment, NN1 1302 may be in training mode during the training phase (e.g., step 1206 of FIG. 12) where at least some of the various images 1301 are included in a training data set and provided as inputs to NN1 1302. In at least one embodiment, NN1 1302 may be in training mode during the validation phase (e.g., step 1208 of FIG. 12) where at least some of the various images 1301 are included in a validation data set and provided as inputs to NN1 1302. The images 1301 may denote images of the system when in one of the sub-states or intermediates states progressing to the major failure or fault state recognized by NN1 1302. However, when the images 1301 are processed by the NN1 1302, the NN1 1302 does not detect the major failure or fault state. Techniques herein use the various internal states of the NN1 1302 as reflected by the weights 1304 of the NN1 after processing the images 1301 to denote various pre-failure states or finer distinct stages or steps progressing to the major fault or failure state. In at least one embodiment, at least some of the sets of weights 1304 of NN1 may be acquired during NN1 1302's training phase using a training data set (e.g., step 1206 of FIG. 12) that includes at least some of the images 1301. In at least one embodiment, at least some of the sets of weights 1304 of NN1 may be acquired after NN1 1302 has completed its training step using a training data set (e.g., step 1206 of FIG. 12) and during the subsequent validation step or phase (e.g., step 1208 of FIG. 12) using a validation data set that includes at least of the images 1301. Such pre-failure states, intermediate states or sub-states, are correlated to different internal states of the NN1 1302. Processing herein trains the second neural network, NN2 1310, to recognize the various pre-failure states, intermediate states or sub-states, based on the different internal states of the first NN, NN1 1302. In this manner, the second NN, NN2 1310, may be used to detect changes in behavior of the NN1 1302 to detect the various pre-failure states, intermediate states or sub-states, prior to the major failure or fault occurrence. Thus, NN2 1310 may detect the one or more of the pre-failure or intermediate states denoting, for example, different levels of warning states corresponding to a particular internal state of the NN1 1302.

With reference to FIG. 13, in at least one embodiment, the weights of NN1 1304 may be represented or converted to an image 1308 whereby the image 1308 may be provided as an input to the NN2 1310 to train the NN2 1310 to recognize the one or more pre-failure or intermediate states. In at least one embodiment, the NN1 1302 and the NN2 1310 may be convolutional neural networks (CNNs). In at least one embodiment, images 1308 provided as inputs to the NN2 1310 to train the NN2 1310 to recognize the one or more pre-failure or intermediate states may be bitmap images. Similarly, the inputs 1301 may also be bitmap images.

As known in the art, a bitmap is an array of bits that specifies the color of each pixel in a rectangular array of pixels. Each pixel may be represented by a number of bits. For color bitmap images, each of the colors R (red), G (green) and B (blue) may be represented by a portion of the bits of the pixel. For a black and white or greyscale bitmap, each pixel may take 1 byte or 8 bits of storage resulting in 256 different states. If these states are mapped onto a ramp of greys from black to white, the bitmap is referred to as a greyscale image. By convention 0 is normally black and 255 white. An embodiment in accordance with the techniques herein may use color or black and white or greyscale bitmaps.

Thus, NN1 1302 may be trained to detect when the system transitions into a resulting state, such as a major fault, failure or malfunction. The system may transition into an intermediate state prior to the resulting state. While the NN1 1302 is in a training mode to detect the intermediate state, the NN1 1302 may process inputs denoting the system in the intermediate state. Internal weights of the NN1 1302 may be adjusted in response to processing the inputs denoting the intermediate state. The internal weights 1304 of the NN1 1302 may be obtained, for example, during training and/or validation phases as part of processing performed to train the first neural network, NN1 1302, to detect the intermediate state. The internal weights 1304 may be used to train a second neural network, NN2 1310, to detect the intermediate state. In at least one embodiment, at least some of the internal weights 1304 may be obtained when NN1 1302 is characterized as being in a steady state where, while NN1 1302 is in the training mode, the internal weights are relatively constant and stable and thereby minimally adjusted (e.g., within some specified tolerance or threshold) while in training mode (e.g., during the training and validation phases) as different inputs denoting the intermediate state are provided to the NN1 1302. In at least one embodiment, the weights 1304 may be converted or represented as images 1308 provided as inputs to the NN2 1310 to train the NN2 1310 to detect the intermediate state.

Following paragraphs refer to a particular example in which the major fault, failure or malfunction may be related to a physical storage device or drive (PD). However, the techniques herein may be more generally applied to any major fault or failure state that has one or more sub-states or intermediate states that may be progressively be detected prior to the major fault or failure state. The PD may be a flash drive that is determined as unusable and taken offline and out of use when the number of unusable cells in the PD reaches a threshold level, such as 70%. The NN1 1302 may be trained to detect this level of unusability as the major failure with respect to a PD. However, it may be desirable to detect other threshold levels of unusable cells of the PD prior to the PD reaching the threshold level of 70% of unusable cells.

As known in the art, flash storage media, such as flash PDs, comprise cells used to store data. Over time, individual cells of the flash PD fail whereby such cells can no longer be written to store data. Over the lifetime of the flash PD, the number of unusable cells increases as more and more cells of the PD experience this wear out and become unusable. Thus, the total number of unusable cells in a flash PD is one way in which the usability of the flash PD may be evaluated. At some point in time when the threshold level of unusable cells is reached, such as 70% of all the PDs cells, the flash PD may be considered to be in a major fault or failure state of unusable and taken offline. When in such a state and as more cells of the PD fail, writes to the flash PD may take longer amounts of time since good or usable cells must be located. Prior to locating a good usable cell of the PD when writing data, processing may traverse other cells which are determined to be unusable and not able to store the requested write data.

Figure 14:
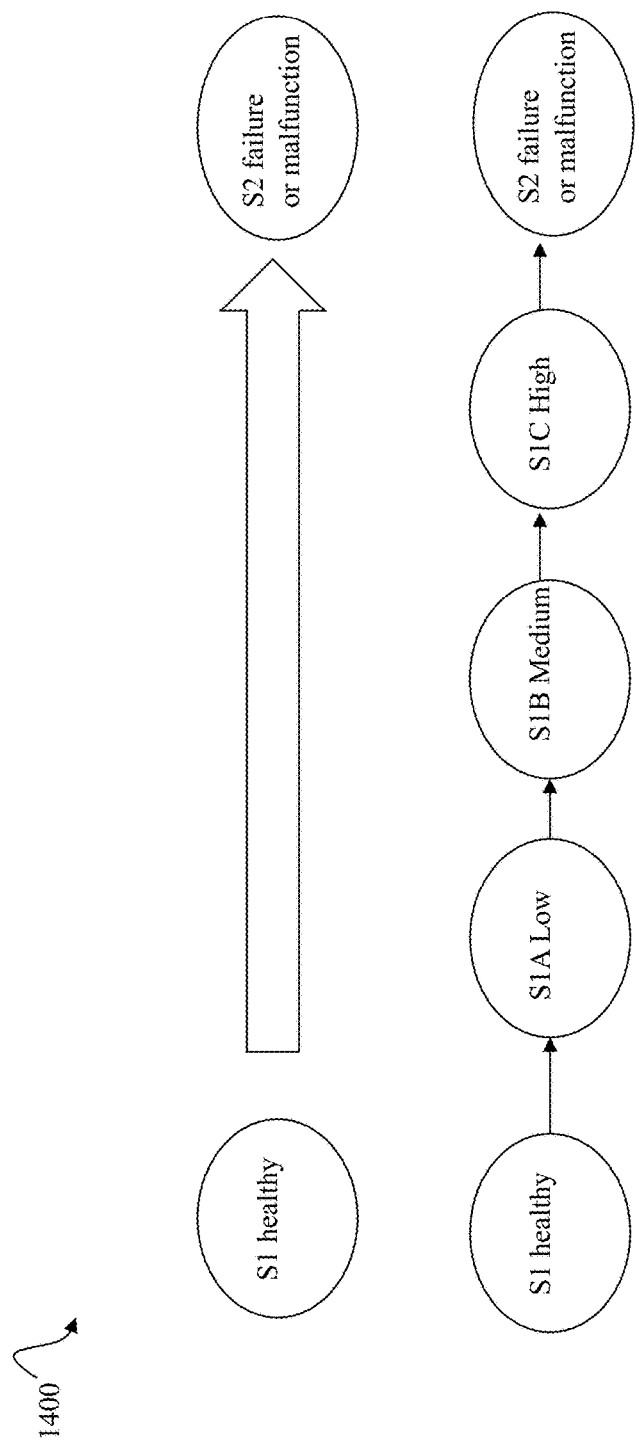
FIG. 14 illustrates intermediates states detected in an embodiment in accordance with the techniques herein.

Referring to FIG. 14, shown is an example 1400 illustrating the various intermediate states that may occur prior to a major failure or malfunction. In the example 1400, S1 denotes a healthy component, such as healthy flash PD and S2 may denote the major fault or malfunction state, such as when the flash PD reaches a maximum threshold number of unusable cells, such as 70% of all its cells are unusable. The NN1 1302 may be trained to detect the occurrence of state S2. However, the NN1 1302 may not be trained to detect intermediate states S1A low, S1B medium and S1C high each of which occur, in sequence, prior to reaching the S2 state. Thus, the foregoing sequence of intermediate states S1A, S1B and S1C may denote an increasing progression in smaller increments of unusable cells in the flash PD. In connection with the techniques herein, the NN2 1310 may be trained to detect and recognize the intermediate states S1A, S1B and S1C based on the internal state of the weights of the NN1 1302. In the following example, state S1A with respect to a flash PD may be detected when the number of unusable cells in the PD reaches 20%. State S1B with respect to a flash PD may be detected when the number of unusable cells in the PD reaches approximately 33%. State S1C with respect to a flash PD may be detected when the number of unusable cells in the PD reaches 50%.

In one aspect, the system as well as the affected component, such as the flash PD, may be characterized as transitioning between the various states of FIG. 15. For example, the PD may transition from the state S1 to the state S1A, transition from the state S1A to the state S1B, transition from the state S1B to the state S1C and then transition from the state S1C to the state S2. In some instances for certain detected states and components, it may be possible to perform a remedial or corrective action to attempt to transition the component from one of the states, such as S1A, S1B or S1C to a healthier state, such as S1 before the component further continues to progress toward S2. In some cases, such as with worn out or unusable cells of a flash PD, it may not be possible return the flash PD to a state with more usable cells. In such a case, the action taken may be to migrate or copy data from the flash PD to another PD prior to the PD reaching the state S2. More detail regarding possible such actions that may be taken is described elsewhere herein.

What will now be described are various examples of the images 1301 that may be provided to the NN1 1302 to denote the various intermediate states S1A, S1B and S1C for use with the techniques herein. The examples of the images 1301 in following figures are simplified to include only a reduced number of components of the system for simplicity of illustration.

Figure 15A:
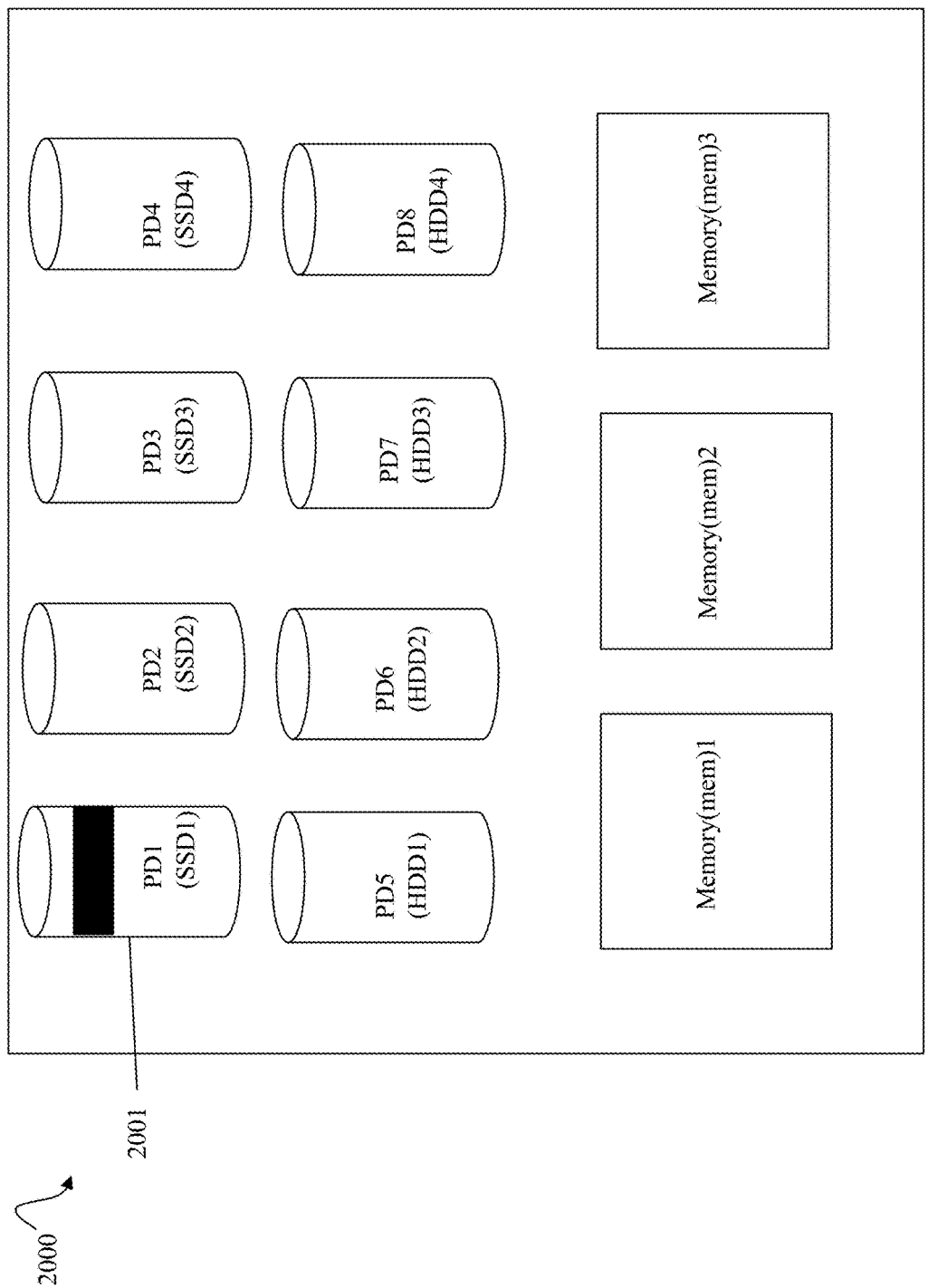
FIGS. 15A-15E are images denoting a first intermediate state that may be used in an embodiment in accordance with the techniques herein.

FIGS. 15A-15E may be included in the images 1301 and denote the first intermediate state S1A for a single flash PD, PD1. Referring to FIG. 15A, the example 2000 is an image of 8 PDs where PDs 1-4 are flash PDs, or more generally, solid state storage (SSD) devices providing non-volatile backend storage. PDs 5-8 may be rotating disk drives, or more generally, hard disk drives (HDDs) providing non-volatile backend storage. Also included in the example 2000 are 3 memory banks or modules (e.g., DRAM storage) within the data storage system providing volatile storage such as may be used for global memory and caching. Each of the FIGS. 15A-E, 16A-E and 17A-E including the same components with different blackened or bolded areas of the PD 1 to denote varying degrees and number of unusable cells in the PD 1. In these figures, PD1 may be shaded by a certain overall percentage to denote the approximate percentage of unusable cells of the PD1 in each of the figures.

In the example 2000 of the FIG. 15A, element 2001 shows a first way in which PD 1 may be annotated with about 10% black shading to denote approximately 10% of the cells of the PD1 as unusable.

Figure 15B:
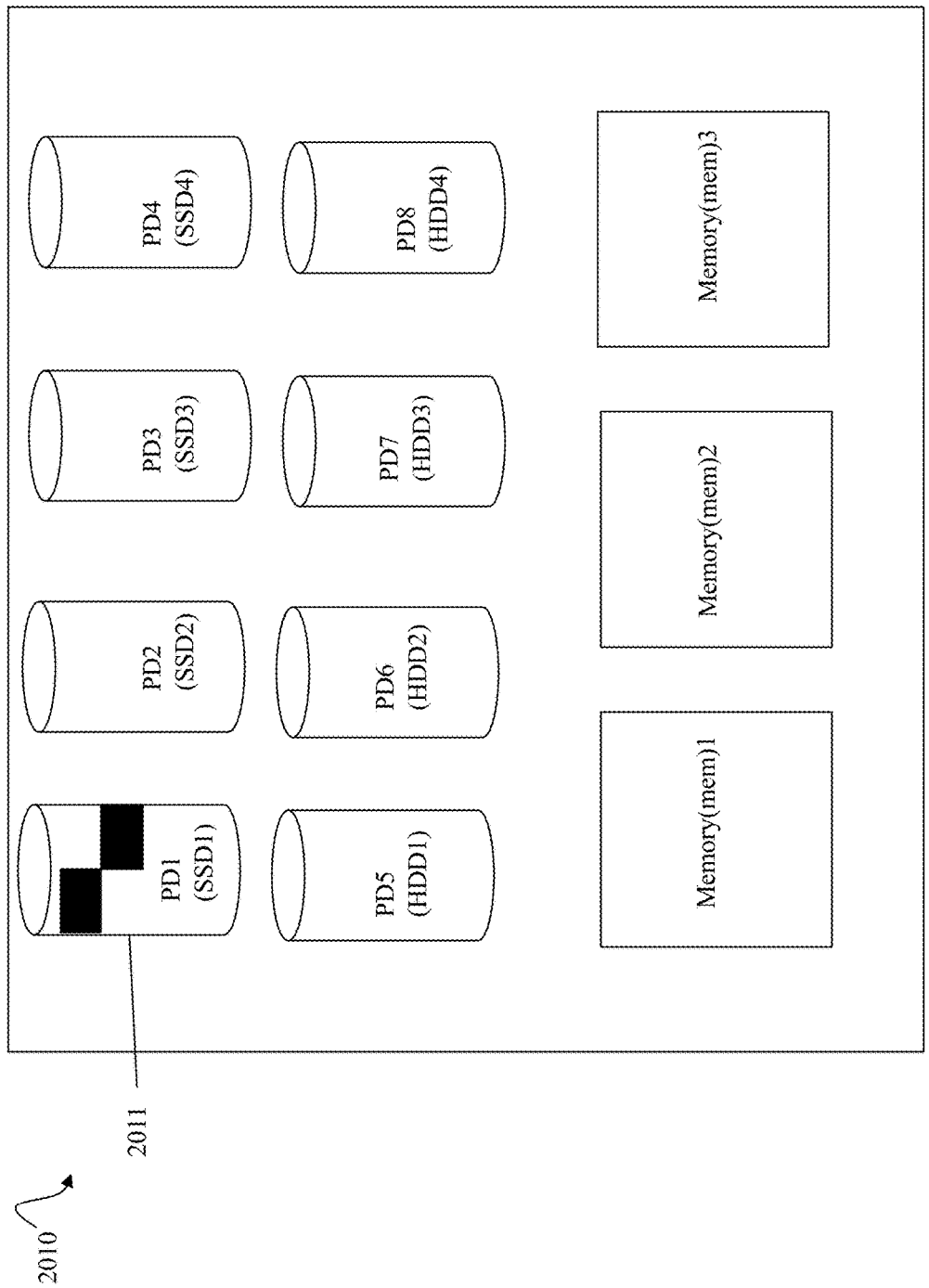

In the example 2010 of the FIG. 15B, element 2011 shows a second way in which PD 1 may be annotated with about 10% black shading to denote approximately 10% of the cells of the PD1 as unusable.

Figure 15C:
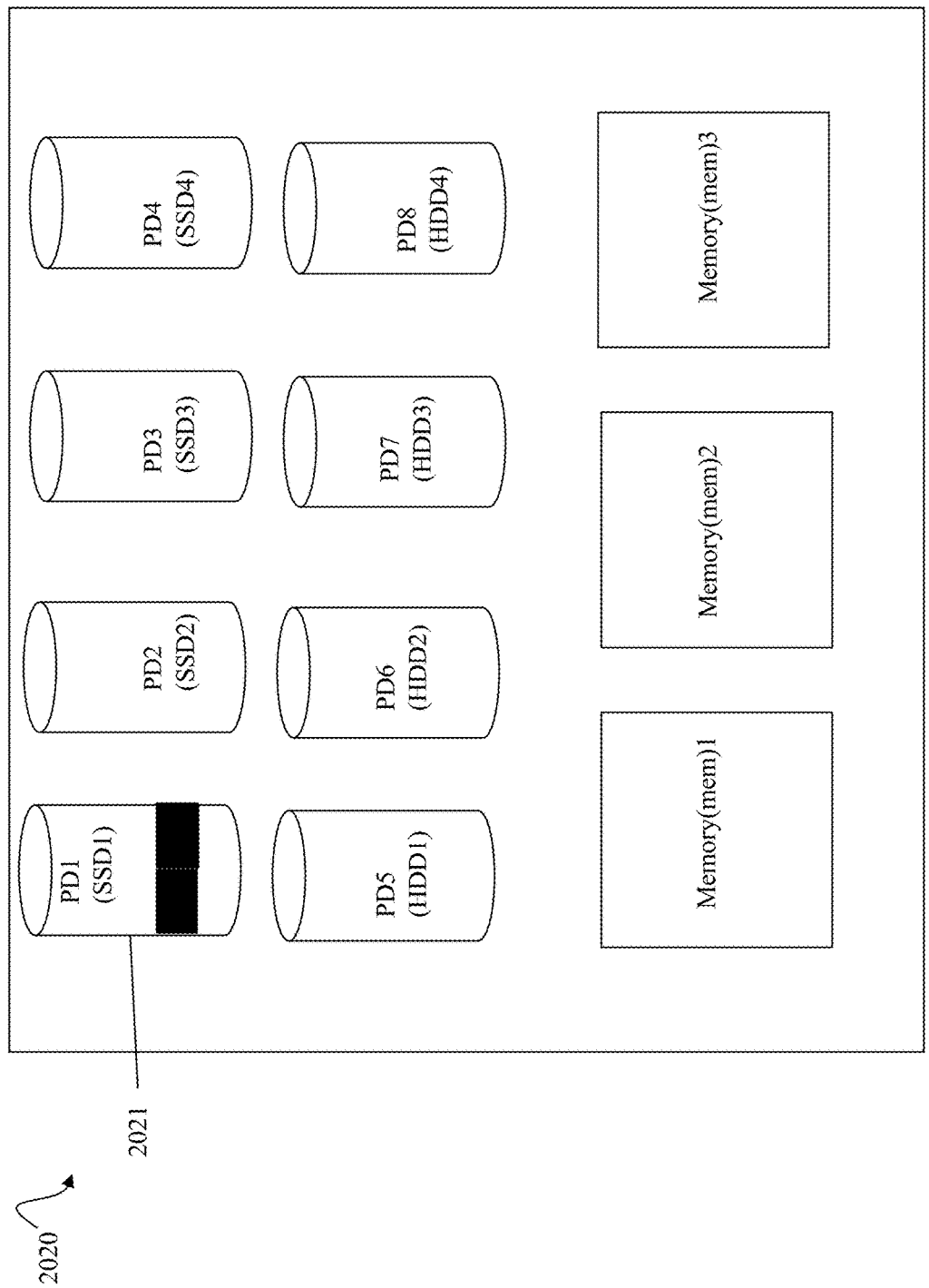

In the example 2020 of the FIG. 15C, element 2021 shows a third way in which PD 1 may be annotated with about 10% black shading to denote approximately 10% of the cells of the PD1 as unusable.

Figure 15D:
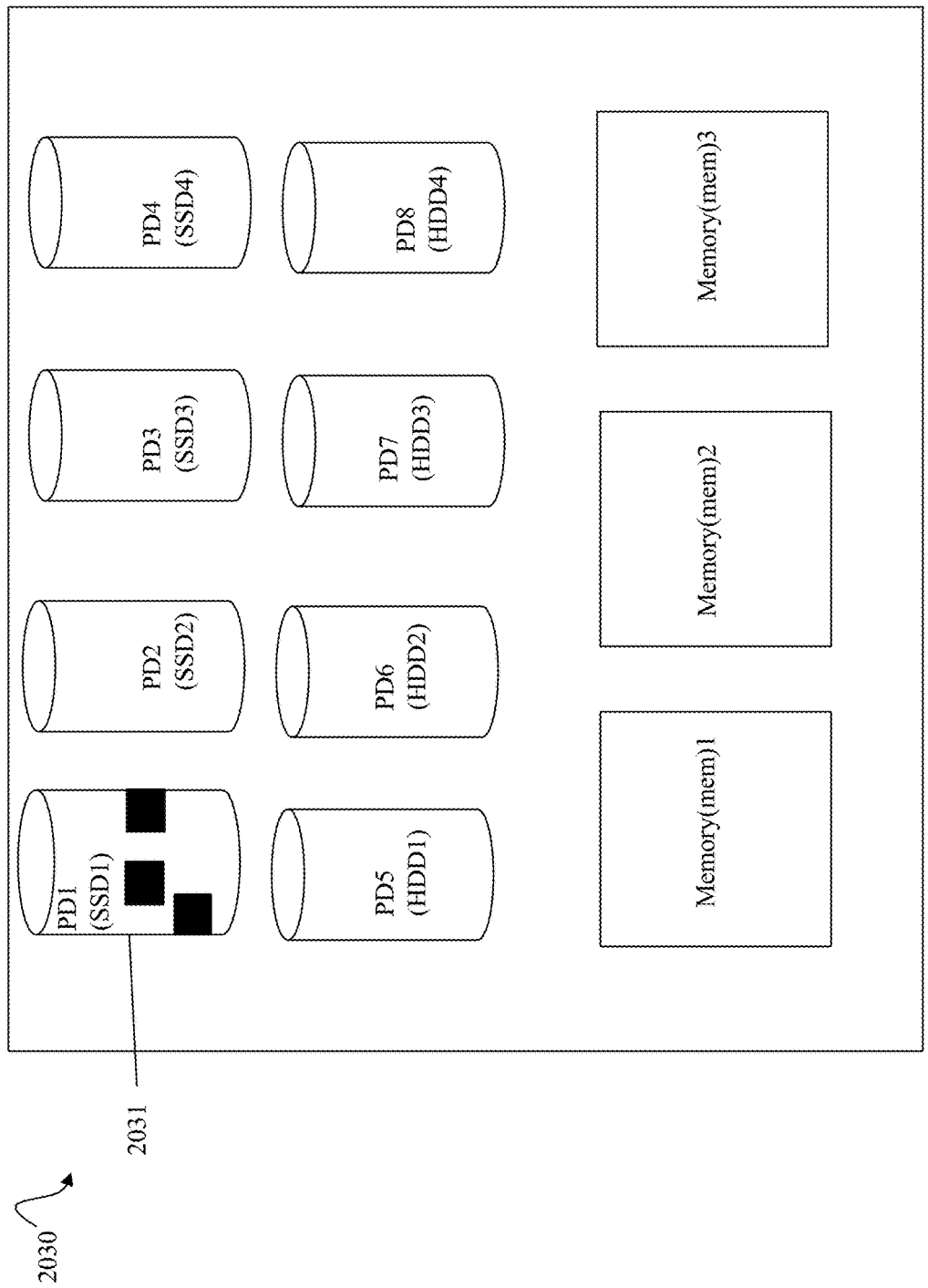

In the example 2030 of the FIG. 15D, element 2031 shows a fourth way in which PD 1 may be annotated with about 10% black shading to denote approximately 10% of the cells of the PD1 as unusable.

Figure 15E:
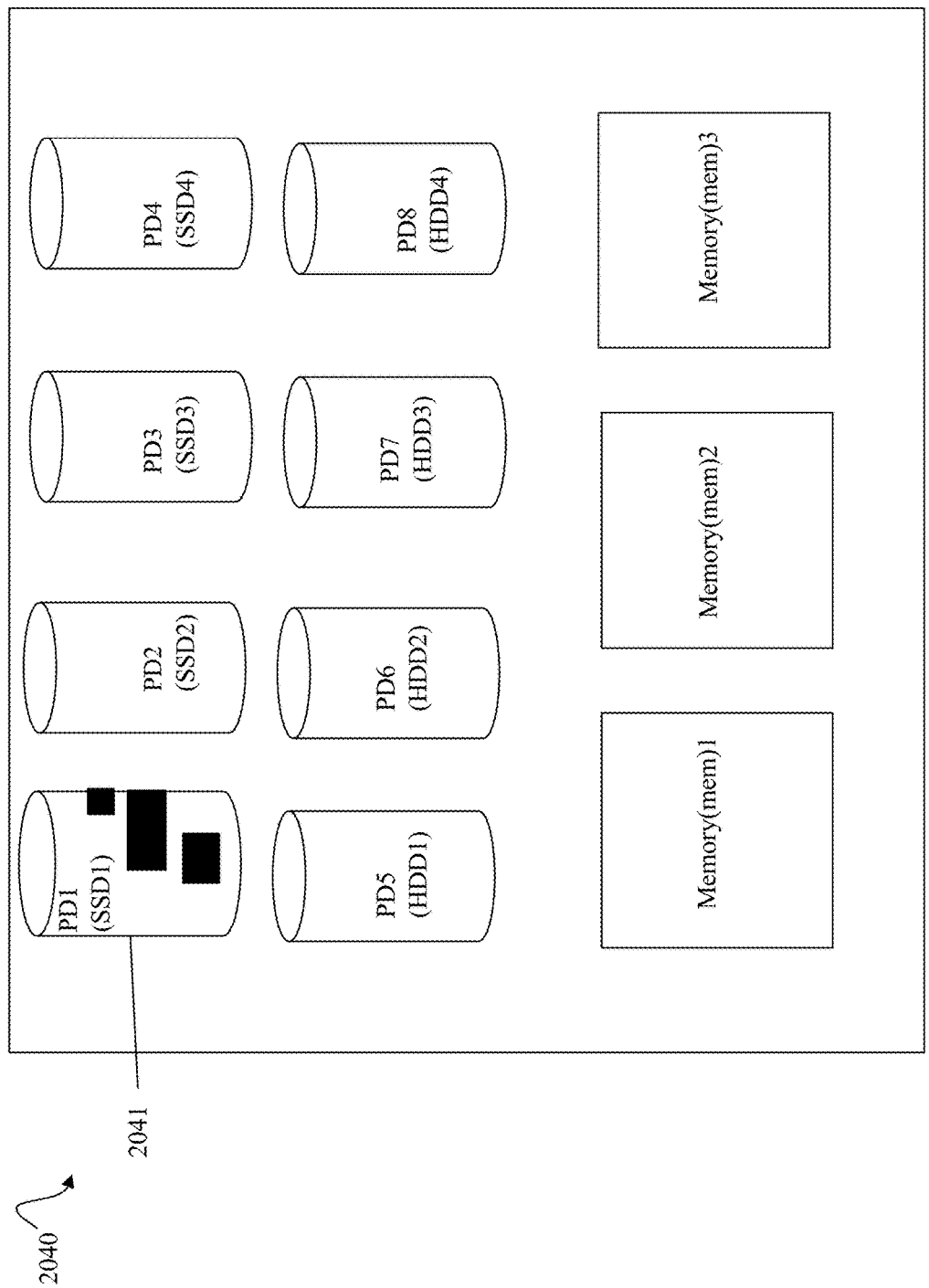

In the example 2040 of the FIG. 15E, element 2041 shows a fifth way in which PD 1 may be annotated with about 10% black shading to denote approximately 10% of the cells of the PD1 as unusable.

FIGS. 16A-16E may be included in the images 1301 and denote the second intermediate state S1B for the single flash PD, PD1.

Figure 16A:
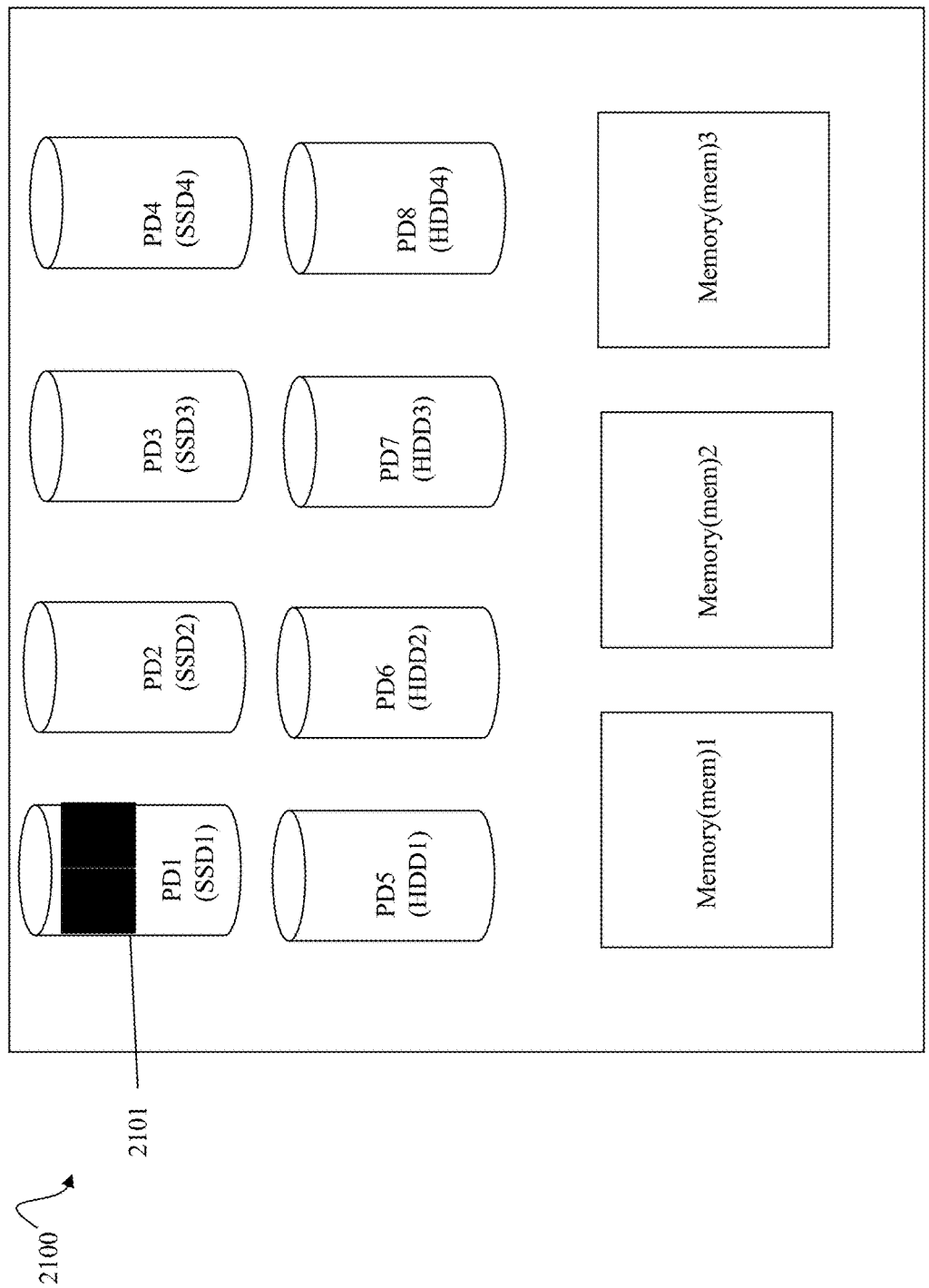
FIGS. 16A-16E are images denoting a second intermediate state that may be used in an embodiment in accordance with the techniques herein.

In the example 2100 of the FIG. 16A, element 2101 shows a first way in which PD 1 may be annotated with about 33% black shading to denote approximately 33% of the cells of the PD1 as unusable.

Figure 16B:
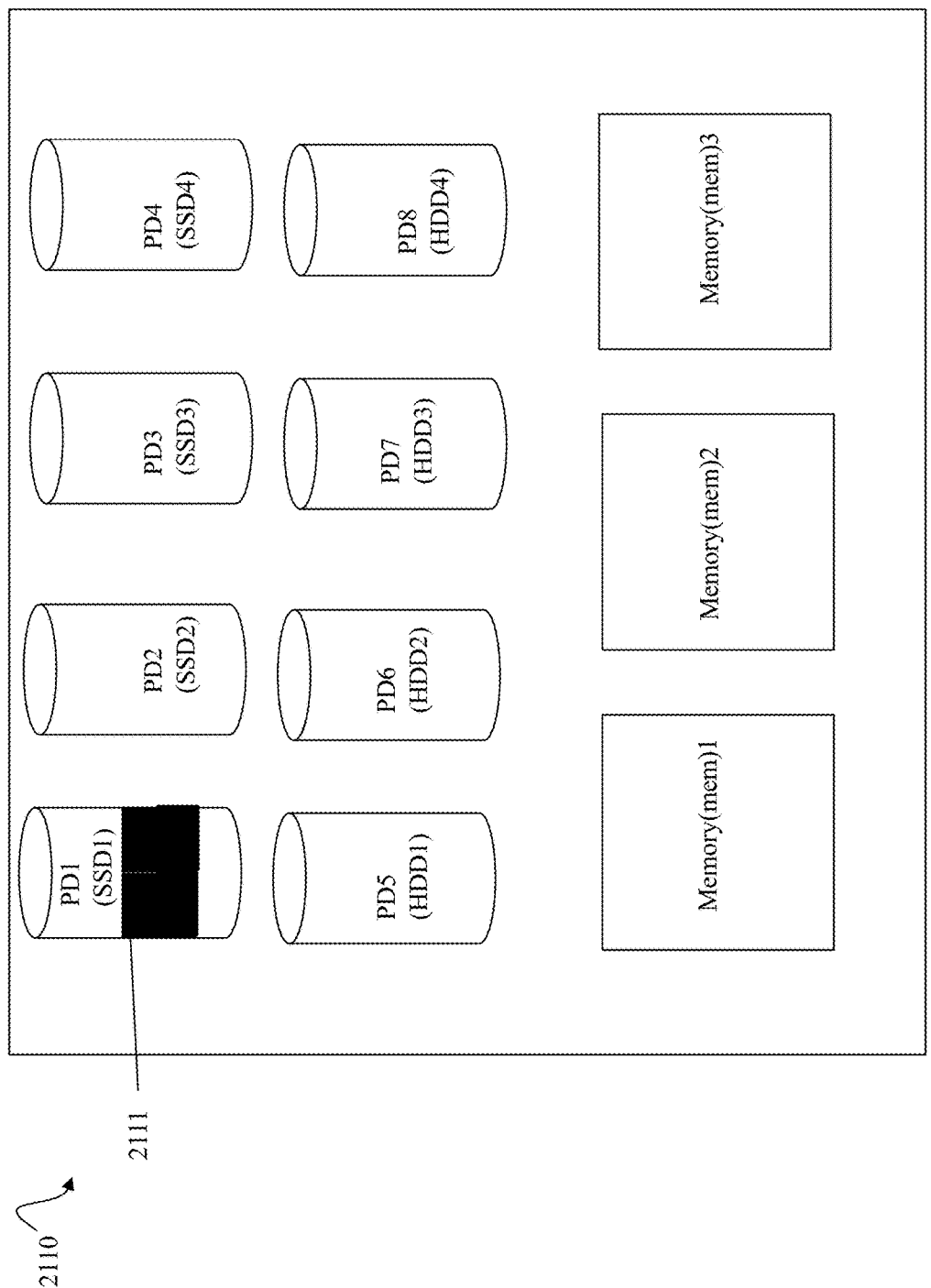

In the example 2110 of the FIG. 16B, element 2111 shows a second way in which PD 1 may be annotated with about 33% black shading to denote approximately 33% of the cells of the PD1 as unusable.

Figure 16C:
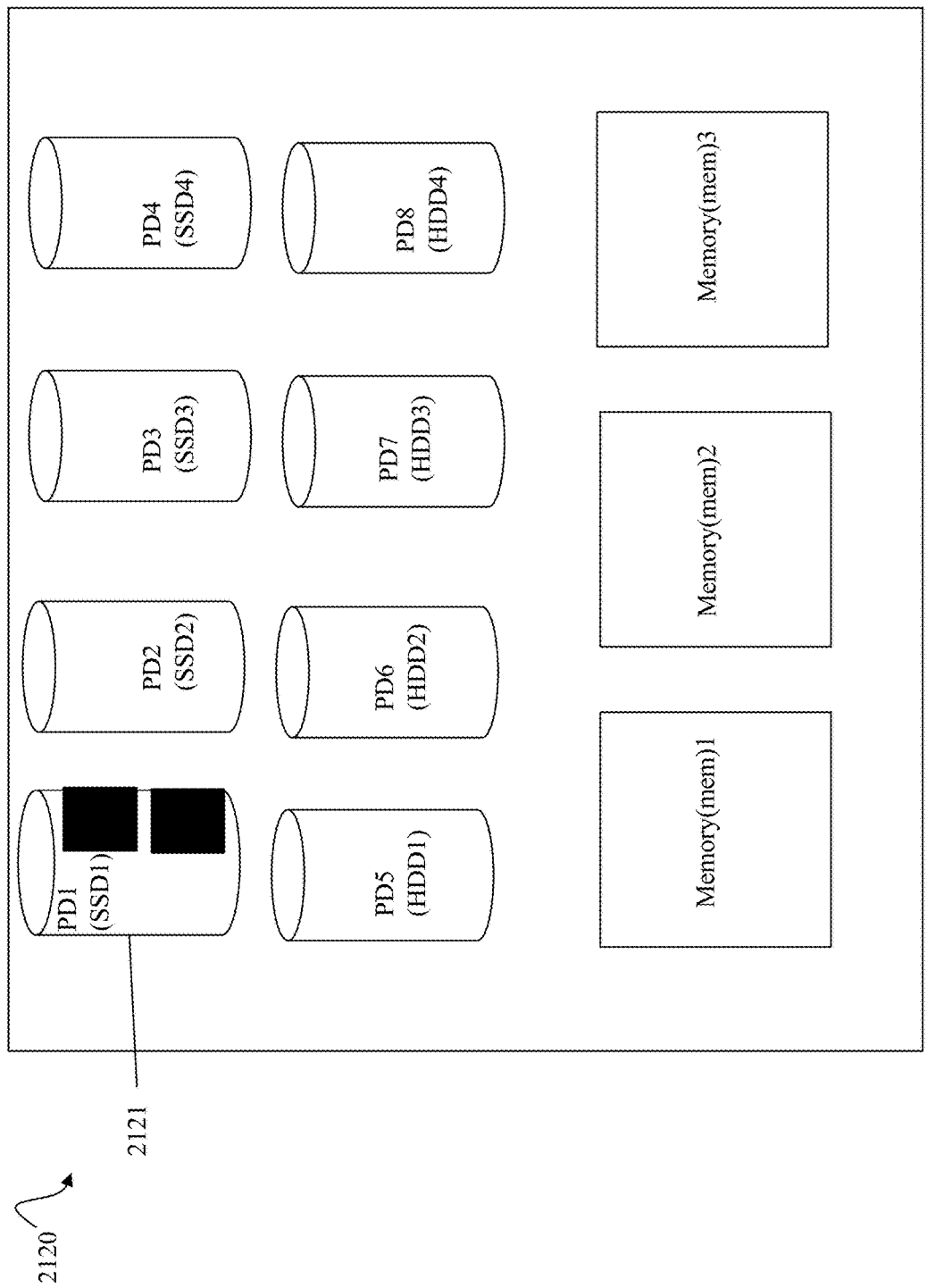

In the example 2120 of the FIG. 16C, element 2121 shows a third way in which PD 1 may be annotated with about 33% black shading to denote approximately 33% of the cells of the PD1 as unusable.

Figure 16D:
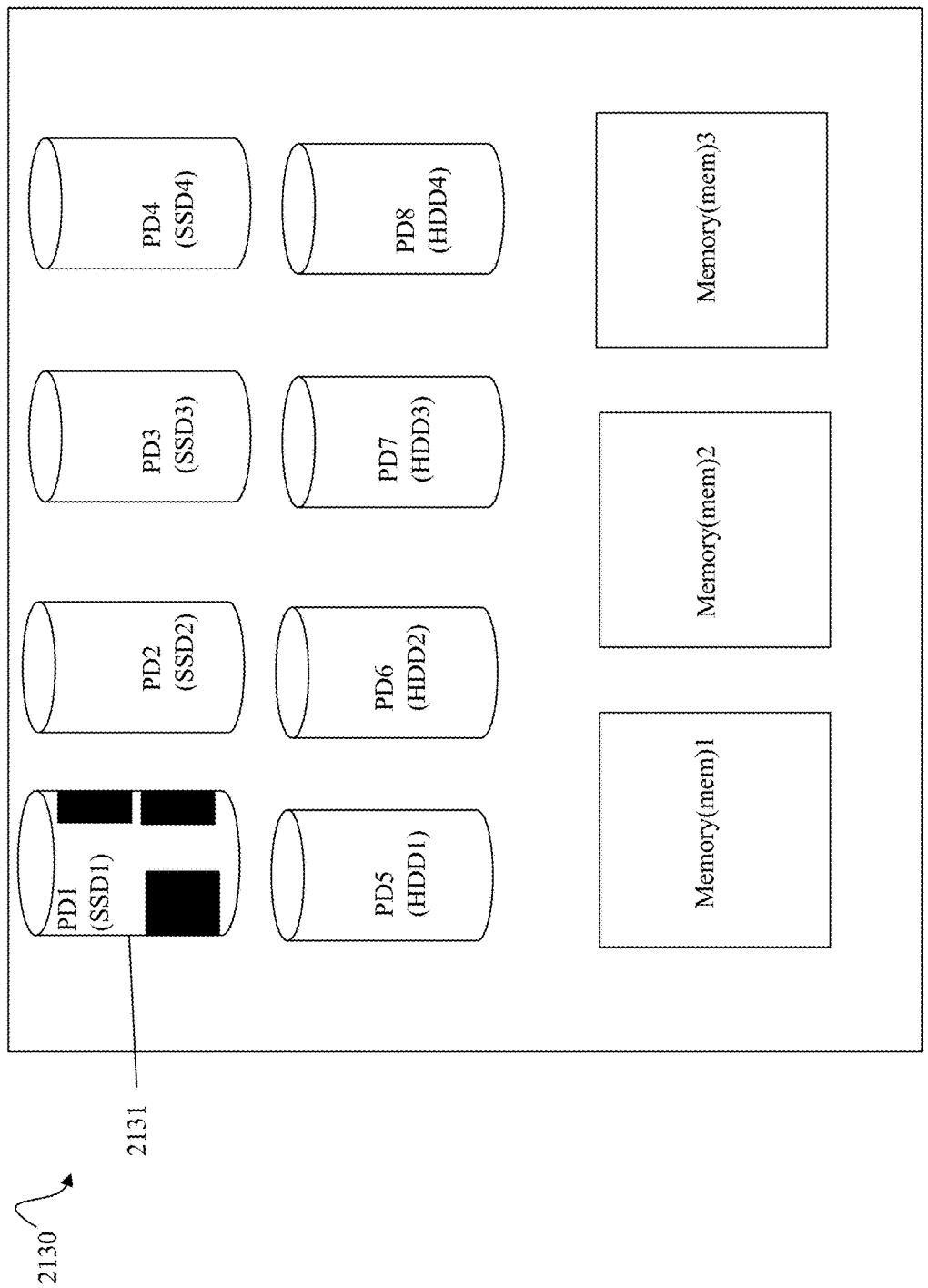
Figure 16E:
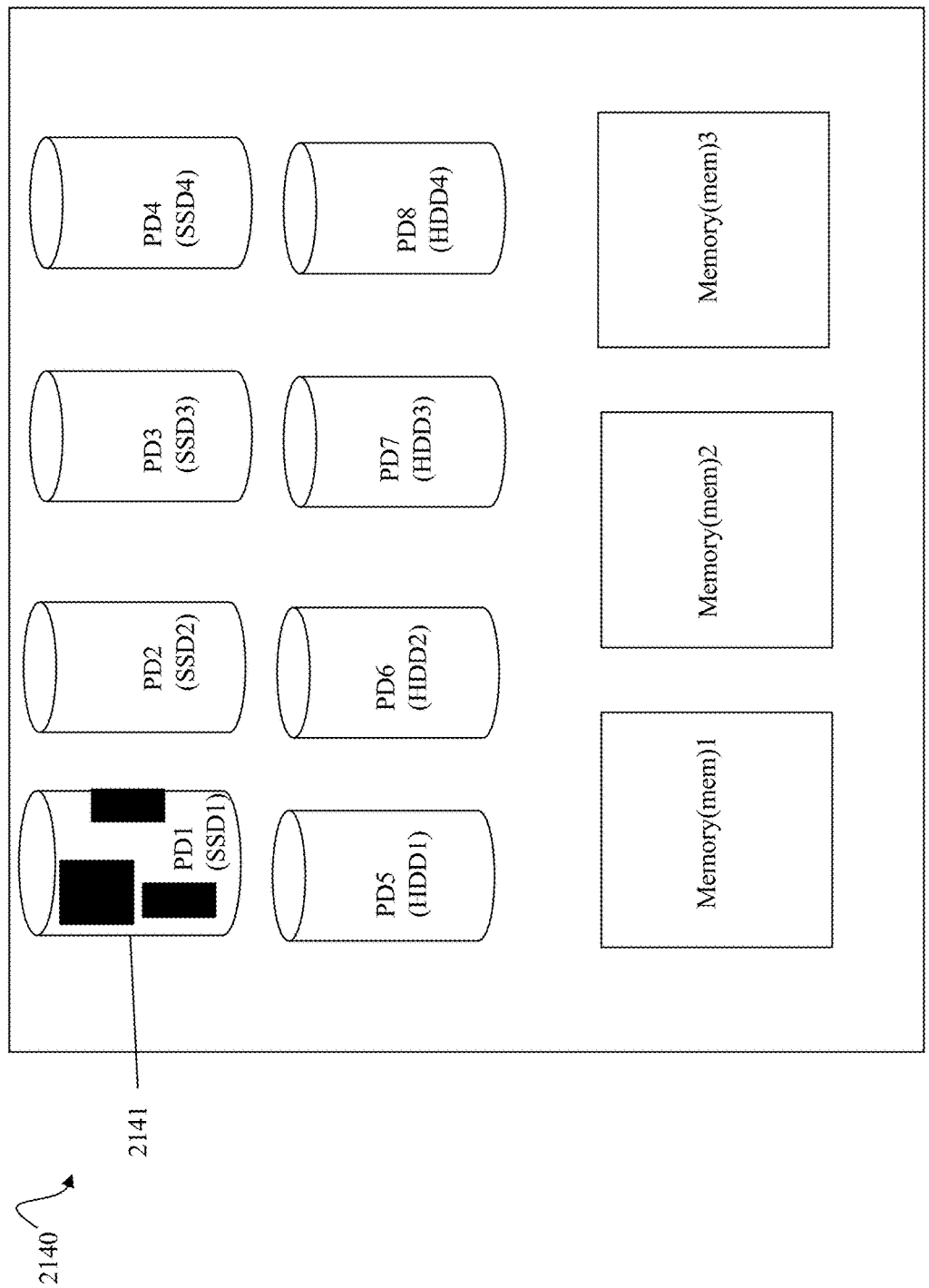

In the example 2130 of the FIG. 16D, element 2131 shows a fourth way in which PD 1 may be annotated with about 33% black shading to denote approximately 33% of the cells of the PD1 as unusable.

In the example 2140 of the FIG. 16D, element 214 shows a fifth way in which PD 1 may be annotated with about 33% black shading to denote approximately 33% of the cells of the PD1 as unusable.

FIGS. 17A-17E may be included in the images 1301 and denote the third intermediate state S1C for the single flash PD, PD1.

Figure 17A:
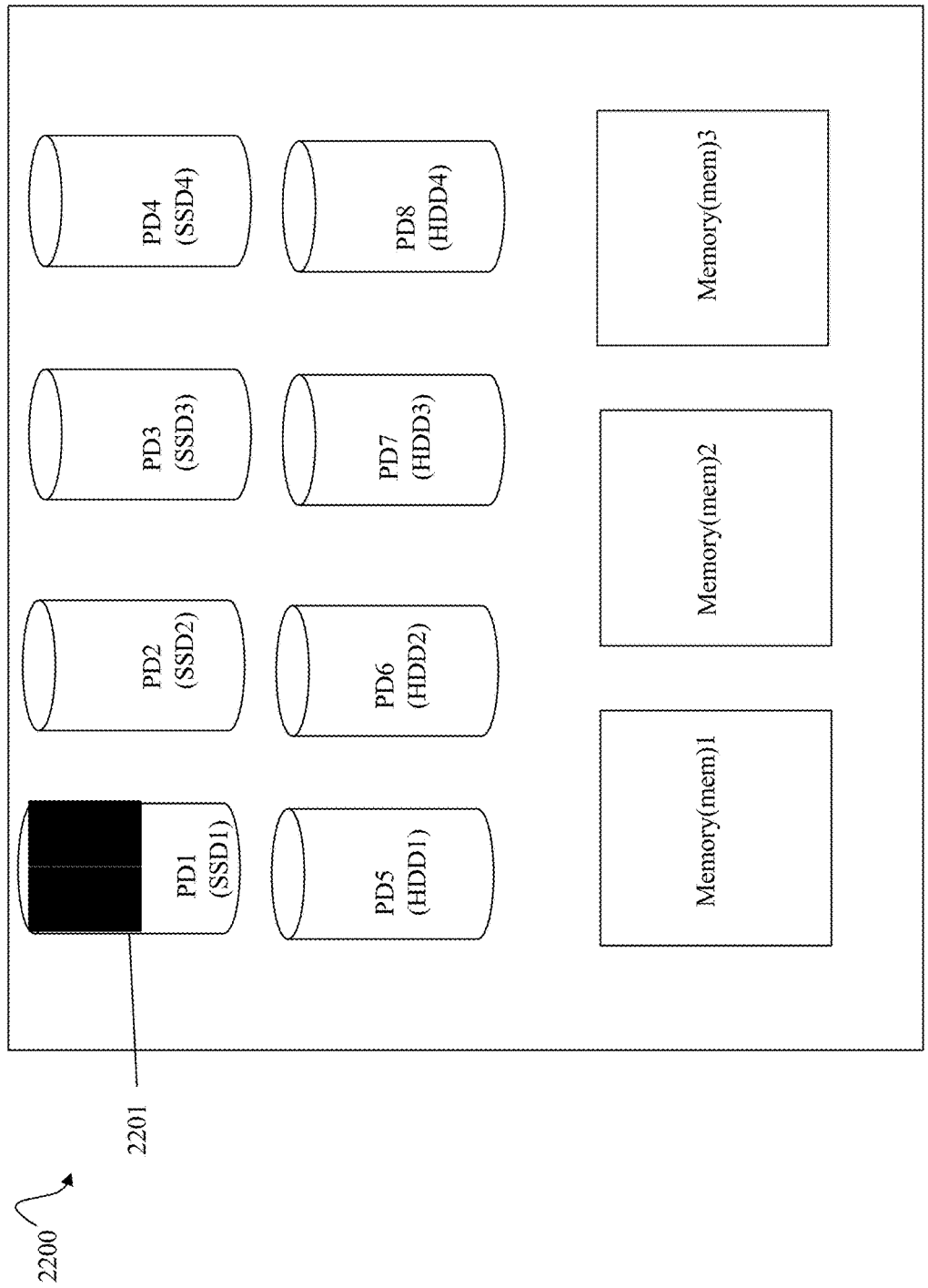
FIGS. 17A-17E are images denoting a third intermediate state that may be used in an embodiment in accordance with the techniques herein.

In the example 2200 of the FIG. 17A, element 2201 shows a first way in which PD 1 may be annotated with about 50% black shading to denote approximately 50% of the cells of the PD1 as unusable.

Figure 17B:
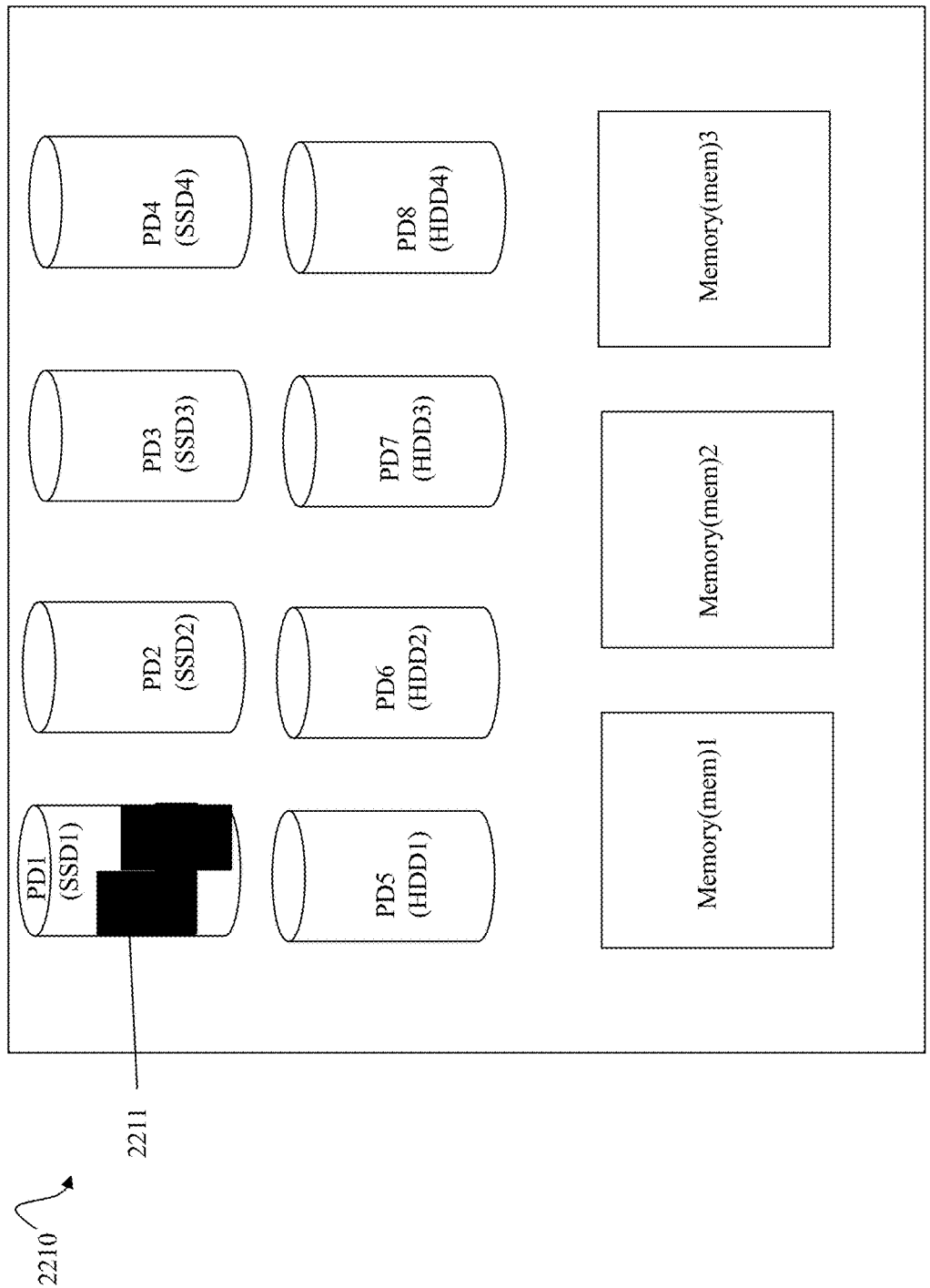

In the example 2210 of the FIG. 17B, element 2211 shows a second way in which PD 1 may be annotated with about 50% black shading to denote approximately 50% of the cells of the PD1 as unusable.

Figure 17C:
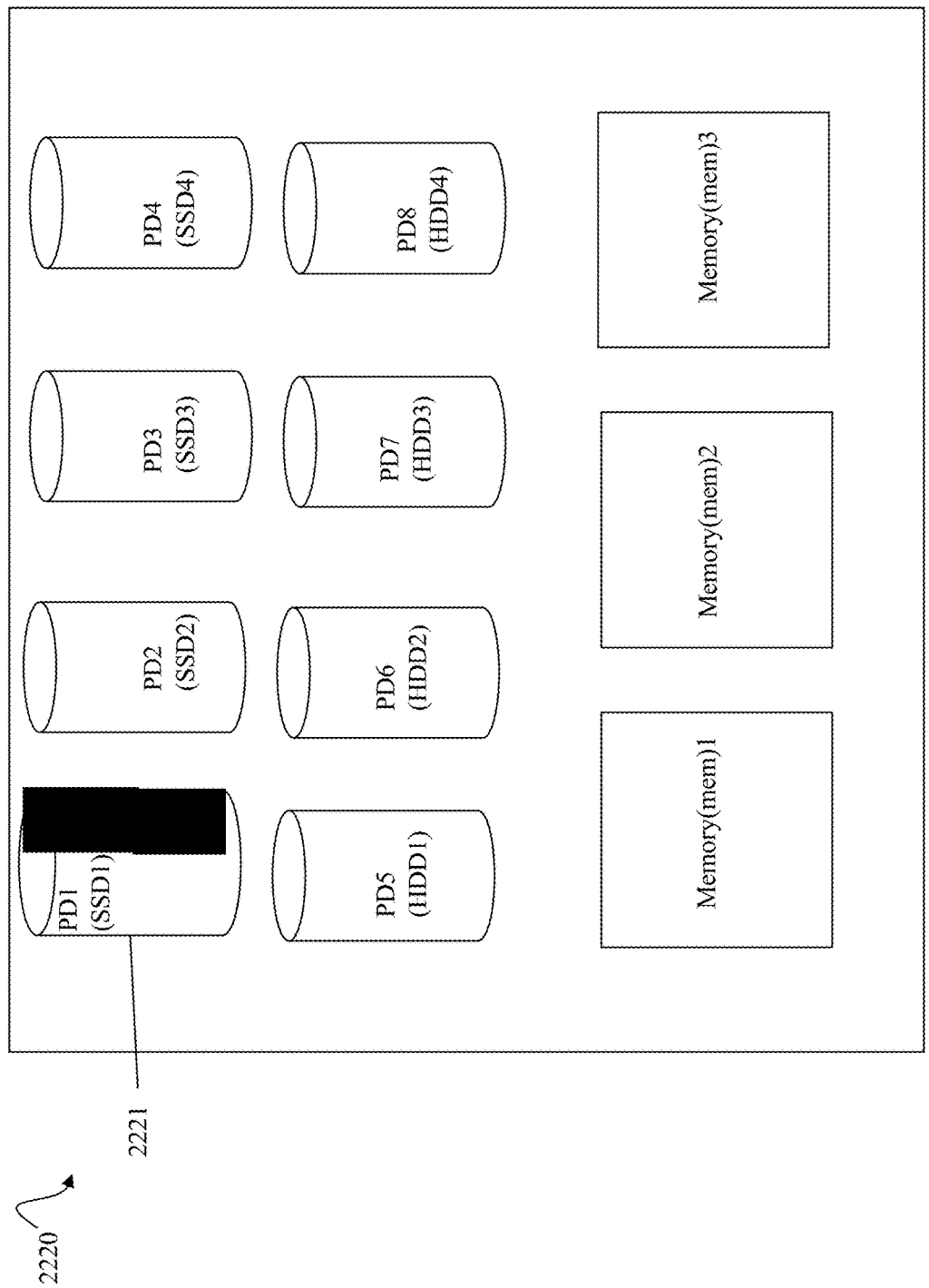

In the example 2220 of the FIG. 17C, element 2221 shows a third way in which PD 1 may be annotated with about 50% black shading to denote approximately 50% of the cells of the PD1 as unusable.

Figure 17D:
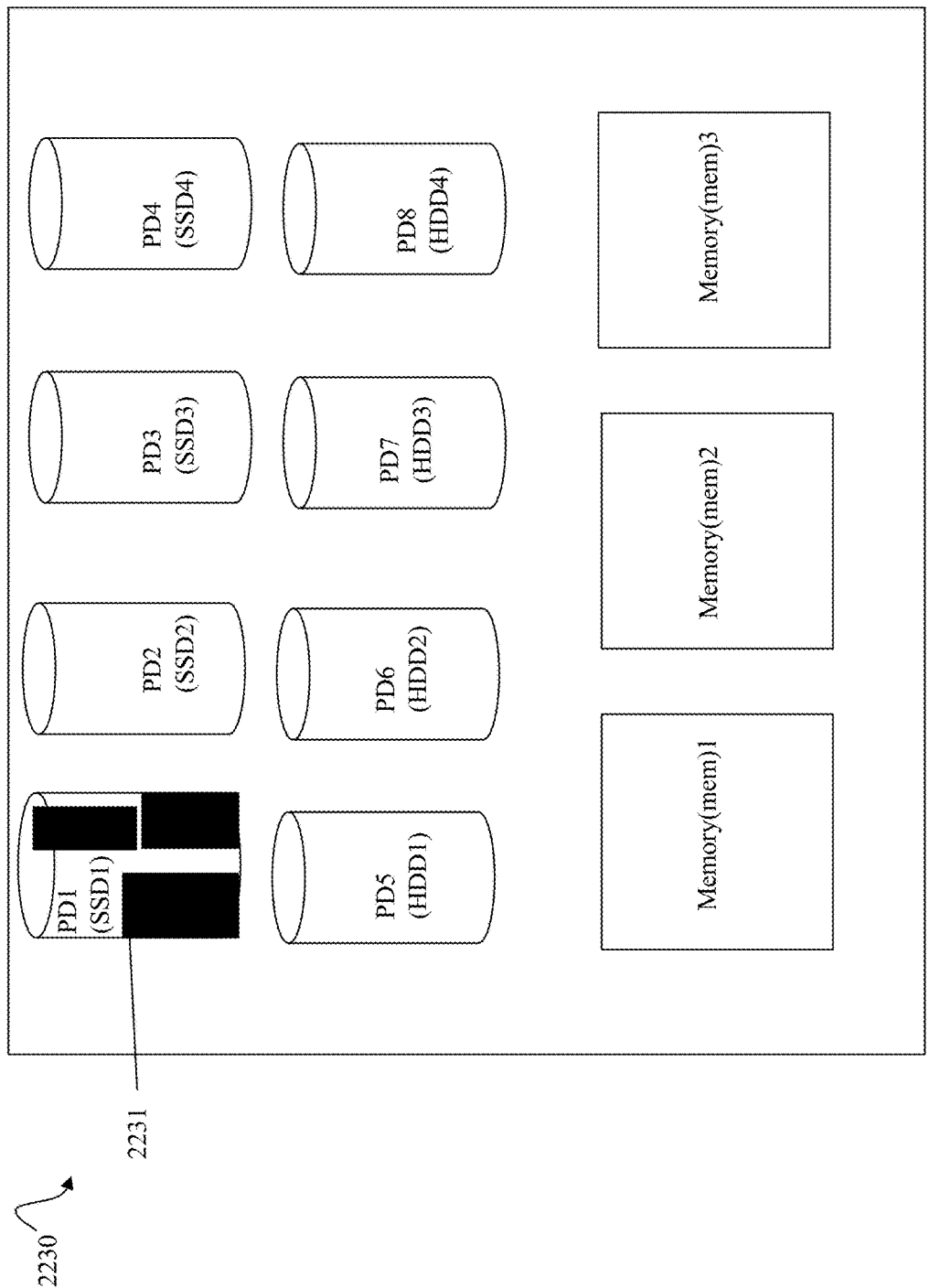

In the example 2230 of the FIG. 17D, element 2231 shows a fourth way in which PD 1 may be annotated with about 50% black shading to denote approximately 50% of the cells of the PD1 as unusable.

Figure 17E:
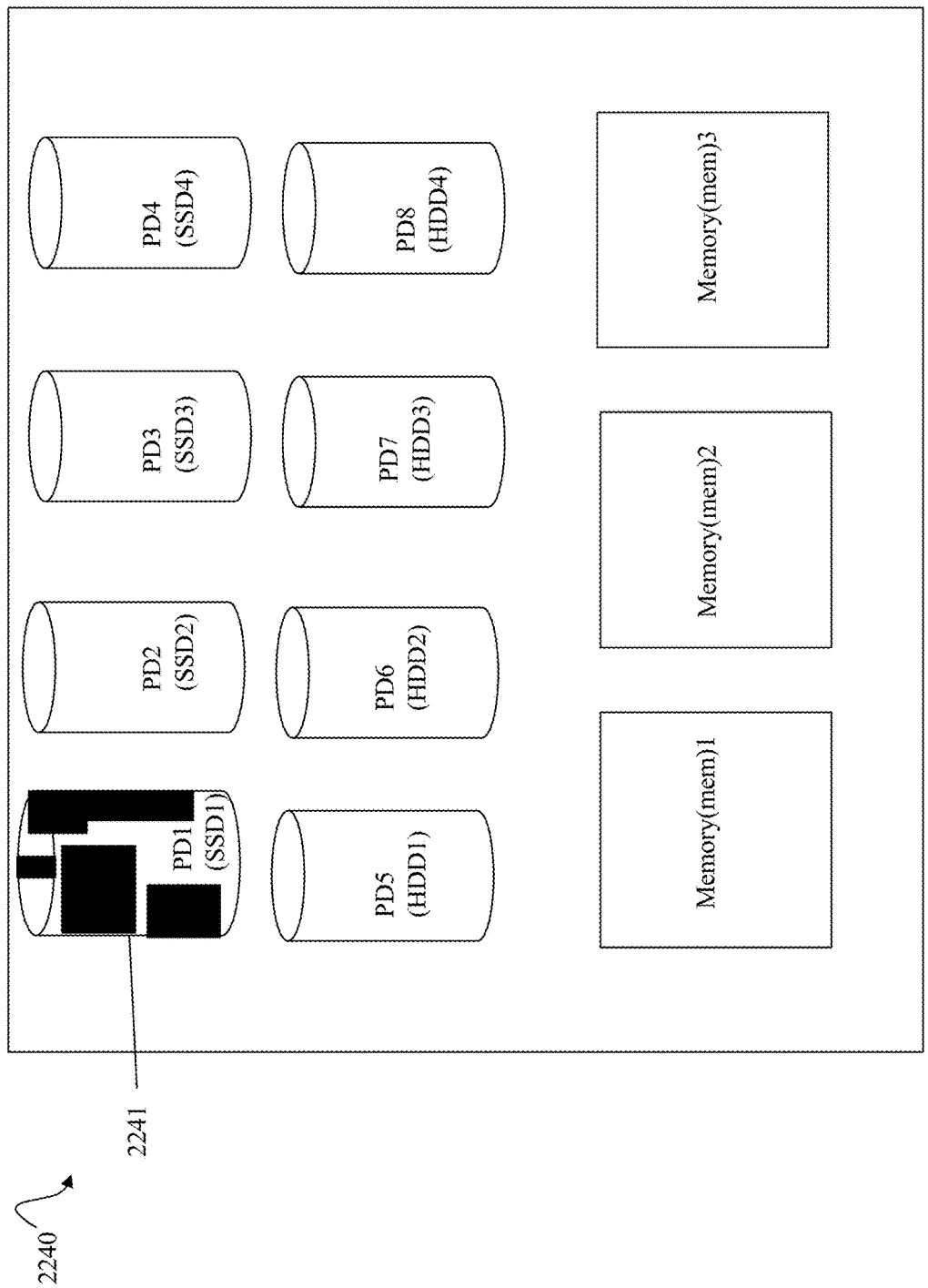

In the example 2240 of the FIG. 17E, element 2241 shows a fifth way in which PD 1 may be annotated with about 50% black shading to denote approximately 50% of the cells of the PD1 as unusable.

With reference back to the FIG. 13, the NN1 1302 has been trained to detect or recognize the major fault or state when 70% of the cells of the PD1 are unusable. However, NN1 1302 does not recognize or detect any of the 3 intermediate states S1A, S1B and S1C. NN1 1302 may be placed in training mode whereby its weights may be adjusted as fed additional images 1301 such as the images of the FIG. 15A-E. Thus, NN1 1302 may be in training mode but providing images of FIGS. 15A-E denoting the intermediate state S1A does not result in any output of NN1 1302 detecting the state S1A (since NN1 1302 has not yet completed training so as to be able to detect the state S1A). However, the internal state of the weights of NN1 1302 after processing each of the images of the FIGS. 15A-15E corresponding to the state S1A may be adjusted or modified. After each of the images of the FIGS. 15A-E is processed by the NN1 1302 and its weights accordingly adjusted as part of ongoing training to detect S1A, its internal state of weights may be captured and stored in a different image 1308 that may then be used to train NN1 1310 to recognize or detect the state S1A based on the weights of the NN1 1302. In at least one embodiment, the weights may be acquired while NN1 1302 is in its training mode, or more generally in a phase or step, such as step 1206 of FIG. 12 or step 1208 of FIG. 12, where its weights and bias values are adjusted subsequent to processing the images of FIG. 15A-15E.

Once images of the FIGS. 15A-E have been processed by the NN1 1302 when in training mode and corresponding images 1308 of the weights of NN1 1302 have been obtained, NN1 1302 may be reset or reinitialized. Such resetting or reinitializing NN1 1302 may include reinitializing the weights and bias values of NN1 1302 to be as they were prior to processing any of the images of FIGS. 15A-E. After such reinitialization of the NN1 1302, NN1 1302 may be placed in training mode whereby its weights may be adjusted as fed additional images 1301 such as the images of the FIG. 16A-E denoting the second intermediate state S1B. Thus, NN1 1302 may be in training mode but providing images of FIGS. 16A-E denoting the intermediate state S1B does not result in any output of NN1 1302 detecting the state S1B (since NN1 1302 has not yet completed training so as to be able to detect the state S1B). However, the internal state of the weights of NN1 1302 after processing each of the images of the FIGS. 16A-16E corresponding to the state S1B may be adjusted or modified. After each of the images of the FIGS. 16A-E is processed by the NN1 1302 and its weights accordingly adjusted as part of ongoing training to detect S1B, its internal state of weights may be captured and stored in a different image 1308 that may then be used to train NN1 1310 to recognize or detect the state S1B based on the weights of the NN1 1302. In at least one embodiment, the weights may be acquired while NN1 1302 is in its training mode, or more generally in a phase or step, such as step 1206 of FIG. 12 or step 1208 of FIG. 12, where its weights and bias values are adjusted subsequent to processing the images of FIG. 16A-16E.

Once images of the FIGS. 16A-E have been processed by the NN1 1302 when in training mode and corresponding images 1308 of the weights of NN1 1302 have been obtained, NN1 1302 may be reset or reinitialized. Such resetting or reinitializing NN1 1302 may include reinitializing the weights and bias values of NN1 1302 to be as they were prior to processing any of the images of FIGS. 15A-E. After such reinitialization of the NN1 1302, NN1 1302 may be placed in training mode whereby its weights may be adjusted as fed additional images 1301 such as the images of the FIG. 17A-E denoting the third intermediate state S1C. Thus, NN1 1302 may be in training mode but providing images of FIGS. 17A-E denoting the intermediate state S1C does not result in any output of NN1 1302 detecting the state S1C (since NN1 1302 has not yet completed training so as to be able to detect the state S1C). However, the internal state of the weights of NN1 1302 after processing each of the images of the FIGS. 17A-17E corresponding to the state S1C may be adjusted or modified. After each of the images of the FIGS. 17A-E is processed by the NN1 1302 and its weights accordingly adjusted as part of ongoing training to detect S1C, its internal state of weights may be captured and stored in a different image 1308 that may then be used to train NN1 1310 to recognize or detect the state S1C based on the weights of the NN1 1302. In at least one embodiment, the weights may be acquired while NN1 1302 is in its training mode, or more generally in a phase or step, such as step 1206 of FIG. 12 or step 1208 of FIG. 12, where its weights and bias values are adjusted subsequent to processing the images of FIG. 17A-17E.

Referring to FIG. 18A, shown is an example illustrating a matrix of weights of the NN1 1302 that may be obtained to denote the internal state of the NN1 1302 in an embodiment in accordance with the techniques herein. The example 1550 provides additional detail regarding the element 1304 of the FIG. 13. Generally, the example 1550 forms a matrix of the weights for inputs to the neurons of the hidden layers and the output layer of the NN1 1302. For example one instance of the matrix 1550 may be obtained after each of the images of FIGS. 15A-E, 16A-E and 17A-E is processed by the NN1 1302 when in training mode. In this manner, 15 matrices such as generally illustrated in the FIG. 18A may be obtained and used as input to train the NN2 1310 to recognize the intermediate states S1A, S1B and S1C. Generally, more images are fed into the NN1 1302 to obtain additional weight matrices in order to generate sufficient data to train the NN2 1310.

The matrix of 1550 generally includes a different weight in each cell or entry. The matrix is two dimensional and includes a number of columns equal to the number of hidden layer in the NN1 1302, plus 1, to account for the output layer weights. For example, if the NN1 1302 includes 10 hidden layers, each matrix includes 11 columns. Each matrix of weights also includes a number of row that may be calculated as follows:

rows=(max number of neurons in any layer*max number of weights/inputs to any neuron of any layer)

where rows denotes the number of rows in the matrix;

"max number of neurons in any layer" denotes the maximum number of neurons in any of the hidden layers and output layer of the NN1 1302; and "max number of weights/inputs to any neuron of any layer" denotes the maximum number of weights or inputs to any neuron in any of the hidden layers and the output layer of the NN1 1302.

It should be noted that a neural network, such as NN1 1302, may have any number of hidden layers, may have any number of neurons in each layer, and each neuron may have any number of inputs depending on the particular connections between different neurons of different layers. Thus, the column and row dimensions of the matrix are based on the maximum number of neurons in any layer and the maximum number of inputs to any single neuron in the NN1 1302. An entry of the matrix may be accessed using a column identifier, Col ID, and a row identifier, Row ID, where the Col ID identifies one of the hidden layers or the output layer, and where the Row ID identifies the particular neuron and the particular weight of the neuron. Thus each column of the matrix 1550 includes the weights for a single one of the hidden layers or the output layer. Since the matrix includes dimensions based on the maximum number of neurons in a layer and the maximum number of inputs or weights to any neuron, entries of the matrix may be zero for example, if a particular layer has less than the maximum number of neurons and if a particular neuron has less than the maximum number of weights or inputs. In one aspect the matrix 1550 may be viewed as a concatenation of the weights of the different hidden and output layers of the NN1 1302.

To further illustrated, reference is made back to the FIG. 10 where the maximum number of nodes in any hidden layer or the output layer is 3 and where the maximum number of weights or inputs to any neuron is 3. For the neural network of FIG. 10 assuming such a neural network is implemented as NN1 1302, the matrix of weights has 3 columns (e.g., 2 hidden layers and 1 output layer), and 9 rows (e.g., maximum of 3 neurons in any layer and maximum of 3 weights or inputs for any neuron). In such a case, the matrix cell or entry [1,1] (for a 1-based array notation may include the weight W4 for neuron H1. The matrix cell or entry [1,2] and [1,3] may both be zero since neuron H1 does not have a second and third weight or inputs. The matrix cell or entry [1,4] may include the weight W5 for the neuron H2. The matrix cell or entry [1,5] may include the weight W6 for the neuron H2. The matrix cell or entry [1,6] may be zero since the neuron H2 does not have a third weight or input. In a similar manner, each weight of the neural network of FIG. 10 may be mapped or translated to a particular entry or cell of the matrix where the column denotes one of the hidden layers or the output layer, and where the row is determined based on the particular neuron and the particular weight of the neuron. In at least one embodiment, the neurons may be placed in a sequential ordering based on the hidden and output layers such as H1, H2, H3, H4, H5, O1 and O2, where each layer has a corresponding integer in the sequence beginning with 1 (e.g., H1 is mapped to 1, H2 is mapped to 2, H3 is mapped to 3, . . . O2 is mapped to 7). If the maximum number of inputs to any neuron is 3, and there are at most 3 neurons in each layer, all weights for the first neuron of a layer may be located in rows 1-3, all weights for the second neuron of a layer may be located in rows 4-6, and the weights for the third neuron of a layer may be located in rows 7-9.

As described elsewhere herein, each instance of the matrix 1550 for a set of weights of the NN1 1302 may be represented or converted to an image such as a bitmap image that may be visually displayed to a user. In at least one embodiment, each weight may be represented by a single pixel in a corresponding bitmap image representing the matrix 1550. The coloring and intensity of the pixel may be determined using the weight value. For example, in at least one embodiment, each of the weights may be normalized and mapped to an integer in the range 0-255, inclusively, where the value of the weight denotes a greyscale value of the pixel for the weight.

Figure 18B:
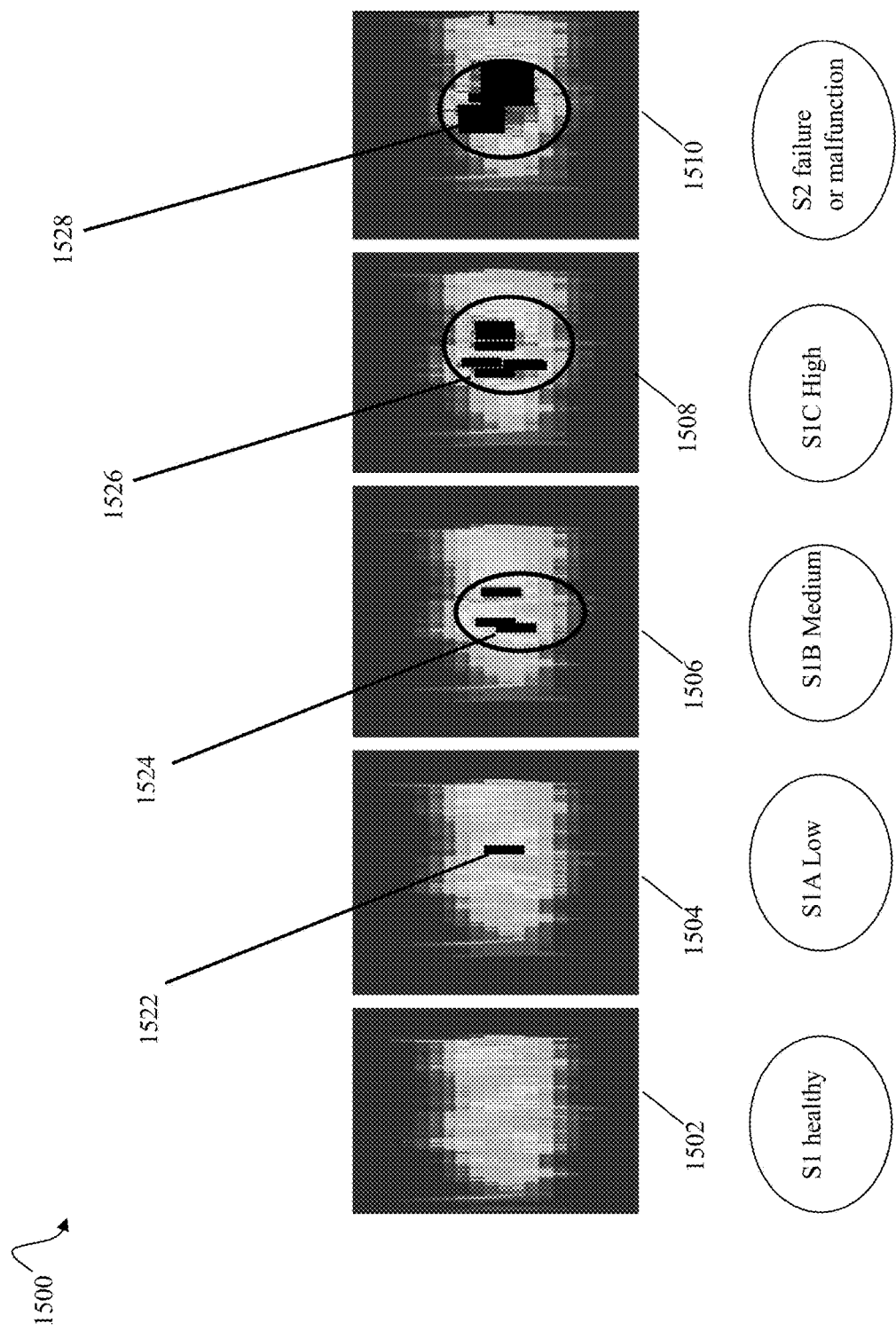
FIG. 18B illustrates images of matrices of weights denoting the internal state of a neural network in an embodiment in accordance with the techniques herein.

Referring to FIG. 18B, shown is an example illustrating images of the weights of the NN1 1302 corresponding to different states in an embodiment in accordance with the techniques herein. The example 1500 includes the image 1502 of the weights of the NN1 1302 when in the healthy state S1. The image 1504 is an image of the weights of the NN1 1302 when in the first intermediate state S1A low. The image 1506 is an image of the weights of the NN1 1302 when in the second intermediate state S1B medium. The image 1508 is an image of the weights of the NN1 1302 when in the third intermediate state S1C high. The image 1510 is an image of the weights of the NN1 1302 when in the S2 major failure or malfunction state.

As can be seen in the image 1504, element 1522 denotes a particular area of the image that has changed in intensity when the NN1 1302 is trained with the images 1301 illustrating the first intermediate state S1A such as in FIGS. 15A-E. Thus, although the NN1 1302 does not detect S1A, its internal state of weights represented as the image 1504 indicates a change from that as illustrated in the image 1502.

As can be seen in the image 1506, element 1524 denotes a particular area of the image that has changed in intensity when the NN1 1302 is trained with the images 1301 illustrating the second intermediate state S1B such as in FIGS. 16A-E. Thus, although the NN1 1302 does not detect S1B, its internal state of weights represented as the image 1506 indicates a change from that as illustrated in the images 1502 and 1504.

As can be seen in the image 1508, element 1526 denotes a particular area of the image that has changed in intensity when the NN1 1302 is trained with the images 1301 illustrating the third intermediate state S1C such as in FIGS. 17A-E. Thus, although the NN1 1302 does not detect S1C, its internal state of weights represented as the image 1508 indicates a change from that as illustrated in the images 1502, 1504 and 1506.

As can be seen in the image 1510, element 1528 denotes a particular area of the image that has changed in intensity when the NN1 1302 has detected the major fault, failure or malfunction as denoted by the state S2. Thus, the internal state of weights of the NN1 1302 represented as the image 1510 indicates a change from that as illustrated in the images 1502, 1504, 1506 and 1508.

It should be noted that although not explicitly described in processing herein, matrices and corresponding images for the weights of the states S1 and S2 may be captured and displayed for reference purposes to a user such as illustrated in the FIG. 18B.

It should be noted that foregoing is one particular example of the particular component and intermediate states that may be detecting using the techniques herein. More generally, the techniques may be used with any component included in the images or bitmaps 1301 of the system. For example, the system may be a data storage system and the bitmaps 1301 may include hardware and software components and different physical and logical storage entities as described above such as in connection with FIGS. 5 and 6. In at least one embodiment, the images of 1301 may be annotated to generally indicate one or more types or factors affecting the health or deterioration of the health of the components or entities. For example, rather than indicate the percentage of unusable cells for a flash PD, the images 1301 denoting the intermediate states may denote other factors such as measured or observed write latency, an average write rate or write data transfer rate (e.g., such as megabytes (MBs) written per second). It is expected, for example, that the write latency will increase and the write rate or write data transfer rate observed will decrease as the number of unusable cells in the flash PD increases. In at least one embodiment, the images 1301 may be populated with indicators denoting the foregoing factors or write latency and write data transfer rate and the NN2 1310 may be trained to detect the states S1A, S1B and S1C based on such multiple complex factors.

For simplicity of illustration, examples of FIGS. 15A-E, 16A-E and 17A-E used as the images 1301 only included dark black shading to denote a particular component's deficiency or level of unusable cells. More generally, as discussed elsewhere herein, any suitable shading, intensity, coloring or other annotation may be made to the images 1301 to denote various levels degradation, health, errors, and the like, for the different components having objects in the images 1301.

It should be noted that once an intermediate state such as one of S1A, S1B or S1C has been detected, an embodiment in accordance with the techniques herein may then take a responsive action. The responsive action taken may vary, of course, with the particular severity and component of the intermediate state detected. The responsive action may, for example, attempt to correct or remediate the current state of the component in efforts to return the component to a healthier state. The responsive action may include a reset or reinitialization of the component, for example, if the component is a hardware component. If the component is a software component, such as the operating system, the responsive action may include a reloading the operating system into memory and/or rebooting the system. If the component is a software component such as a file system with file corruption or other file system errors, the responsive action may include running a utility, such as fsck (file system consistency check) to detect file system errors and inconsistencies and repair any detected inconsistencies. As known in the art, fsck is a tool for checking the consistency of a file system in UNIX® operating systems, such as Linux, macOS, and FreeBSD. A similar command, CHKDSK exists in Microsoft® Windows® operating systems. If the component is a hardware component, such as the PD1 of FIG. 15A, that is progressing toward further failure or unusability, a responsive action may include migrating or copying data from the PD1 to a second healthier physical device. The foregoing action of migrating or copying may be completed prior to the expected or estimated time at which the first physical device is expected to progress to the failure or unusable state.

What will now be described are flowcharts summarizing processing described above.

Figure 19A:
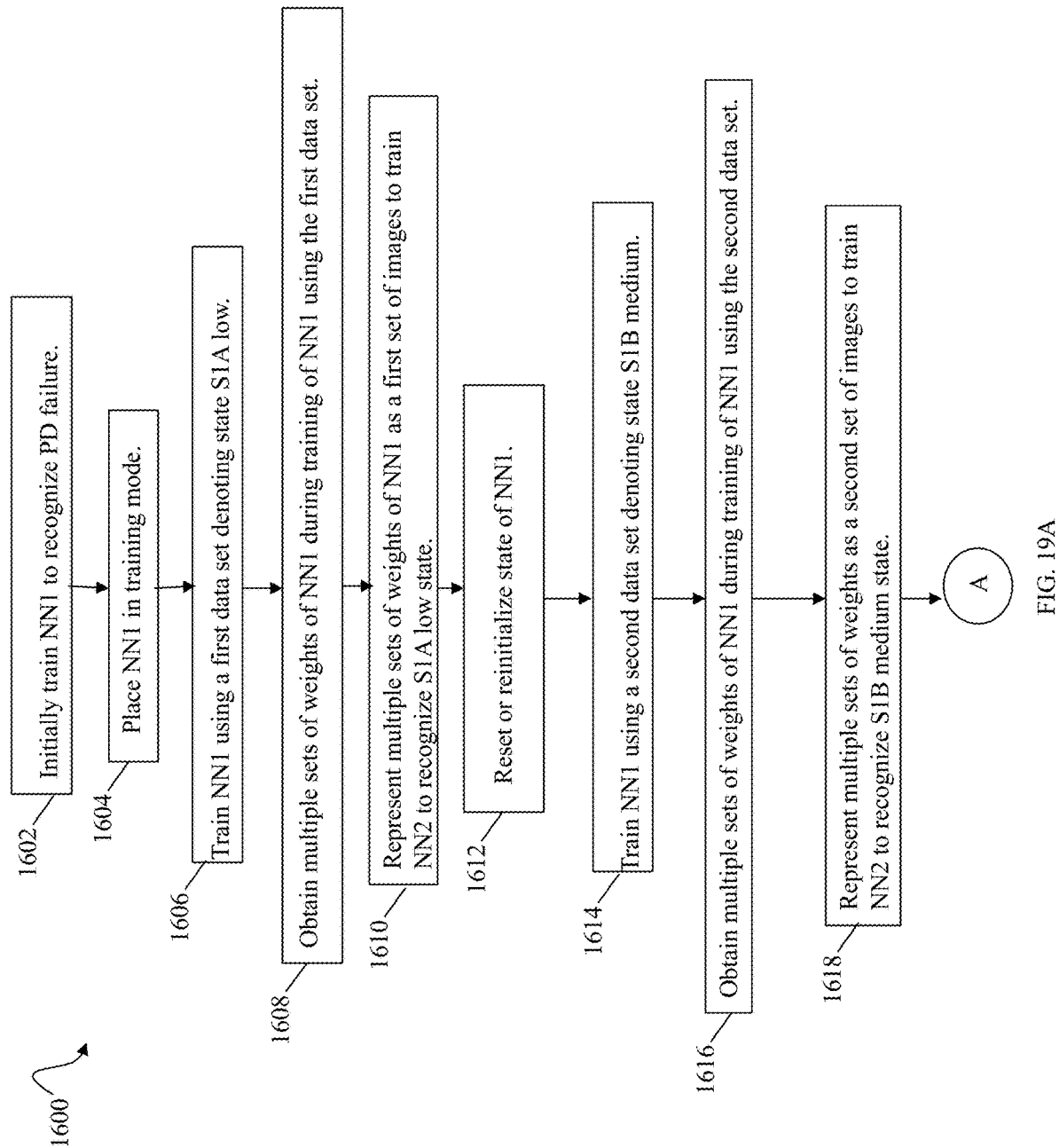
Figure 19B:
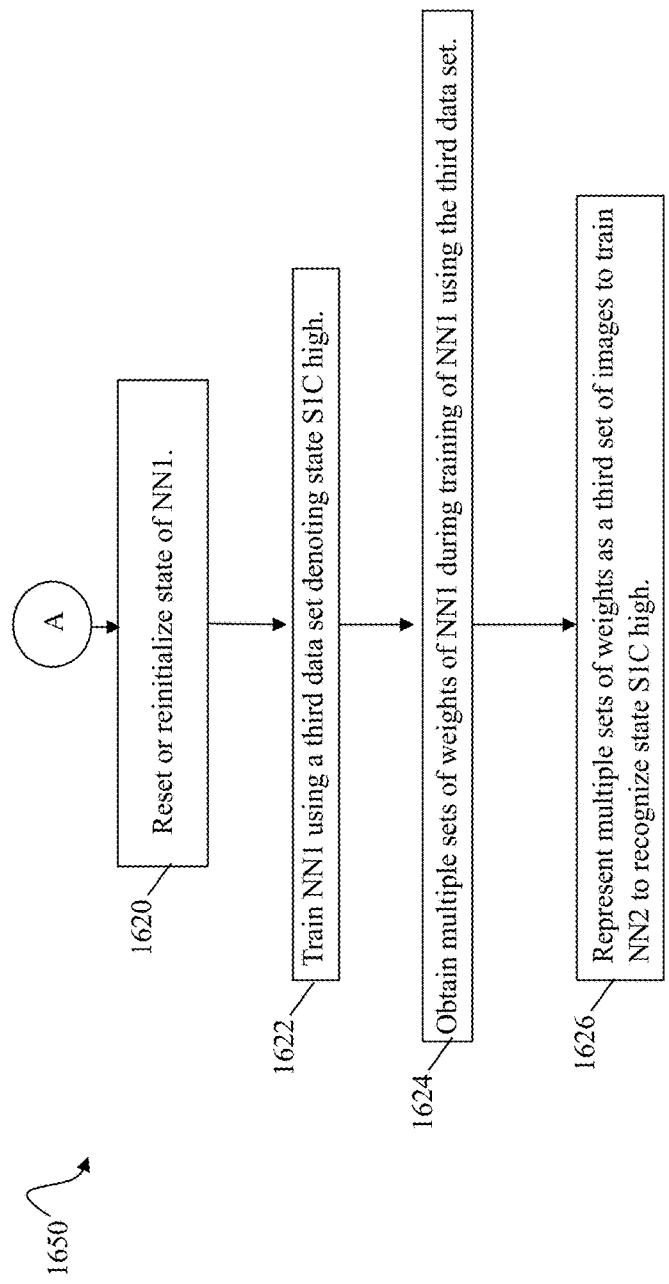

Referring to FIGS. 19A-19B, shown are processing steps that may be performed in an embodiment in accordance with the techniques herein. The flowcharts 1600, 1650 outline processing steps that may be performed in an embodiment using techniques herein to obtain data used to train NN2 1310 to recognize or detect the intermediate states S1A, S1B and S1C. It is straightforward to further adapt processing of FIGS. 19A-19B and as described herein for use with obtaining data used to train NN2 1310 to detecting any suitable number of one or more intermediate states with respect to any fault or failure and any component of the system.

At the step 1602, NN1 1302 may be initially trained to recognize a PD major failure or malfunction state, such as state S2 described herein. The internal state of NN1 may be characterized by a set of weights and bias values determined as result of such training in step 1602. The set of weights and bias values may also be used in subsequent steps to reinitialize or reset NN1 to its state at a first point in time corresponding to the step 1602.

From the step 1602, control proceeds to the step 1604. At the step 1604, NN1 is placed in training mode whereby the weights may be adjusted during subsequent training in attempts to further train NN1 to recognize the intermediate state S1A. From the step 1604, control proceeds to the step 1606. At the step 1606, NN1 is trained using a first data set denoting the state S1A. the first data set may include, for example, images as described in connection with FIGS. 15A-E. From the step 1606, control proceeds to the step 1608. At the step 1608, processing is performed to obtain multiple sets or matrices of weights of NN1 during training in step 1606 using the first data set. In at least one embodiment, at least some of the images of the first data set may be included in a training data set and at least some of the multiple sets or matrices of weights may be acquired while performing the training phase or step (e.g., 1206 of FIG. 12) using the training data set to recognize the state S1A. In at least one embodiment, at least some of the images of the first data set may be included in a validation data set and at least some of the multiple sets or matrices of weights may be acquired while performing the validation phase or step (e.g., 1208 of FIG. 12) using the validation data set with respect to validation performed for recognizing the state S1A. From the step 1608, control proceeds to the step 1610. At the step 1610, processing is performed to represent the multiple sets or matrices of weights of NN1 as a first set of images to train NN1 to recognized the state S1A. From the step 1610, control proceeds to the step 1612.

At the step 1612, NN1 is reset or reinitialized to its state from the step 1602 at the first point in time. Such reinitialization may be performed by resetting the weights and bias values, or generally, the internal state of the NN1, to be as it was at the first point in time at step 1602 after the initial training was completed. From the step 1612, control proceeds to the step 1614. At the step 1614, processing is performed to train NN1 using a second data set denoting the state S1B. From the step 1614, control proceeds to the step 1616. At the step 1616, processing is performed to obtain multiple sets or matrices of weights of NN1 during training in step 1614 using the second data set. In at least one embodiment, at least some of the images of the second data set may be included in a training data set and at least some of the multiple sets or matrices of weights may be acquired while performing the training phase or step (e.g., 1206 of FIG. 12) using the training data set to recognize the state S1B. In at least one embodiment, at least some of the images of the second data set may be included in a validation data set and at least some of the multiple sets or matrices of weights may be acquired while performing the validation phase or step (e.g., 1208 of FIG. 12) using the validation data set with respect to validation performed for recognizing the state S1B. From the step 1616, control proceeds to the step 1618. At the step 1618, processing is performed to represent the multiple sets or matrices of weights of NN1 (from step 1616) as a second set of images to train NN1 to recognized the state S1B. From the step 1618, control proceeds to the step 1620.

At the step 1620, NN1 is reset or reinitialized to its state from the step 1602 at the first point in time. Such reinitialization may be performed by resetting the weights and bias values, or generally, the internal state of the NN1, to be as it was at the first point in time at step 1602 after the initial training was completed. From the step 1620, control proceeds to the step 1622. At the step 1622, processing is performed to train NN1 using a third data set denoting the state S1C. From the step 1622, control proceeds to the step 1624. At the step 1624, processing is performed to obtain multiple sets or matrices of weights of NN1 during training in the step 1622 using the third data set. In at least one embodiment, at least some of the images of the third data set may be included in a training data set and at least some of the multiple sets or matrices of weights may be acquired while performing the training phase or step (e.g., 1206 of FIG. 12) using the training data set to recognize the state S1C. In at least one embodiment, at least some of the images of the third data set may be included in a validation data set and at least some of the multiple sets or matrices of weights may be acquired while performing the validation phase or step (e.g., 1208 of FIG. 12) using the validation data set with respect to validation performed for recognizing the state S1C. From the step 1624, control proceeds to the step 1626. At the step 1626, processing is performed to represent the multiple sets or matrices of weights of NN1 (from step 1624) as a third set of images to train NN1 to recognized the state S1C.

Figure 20:
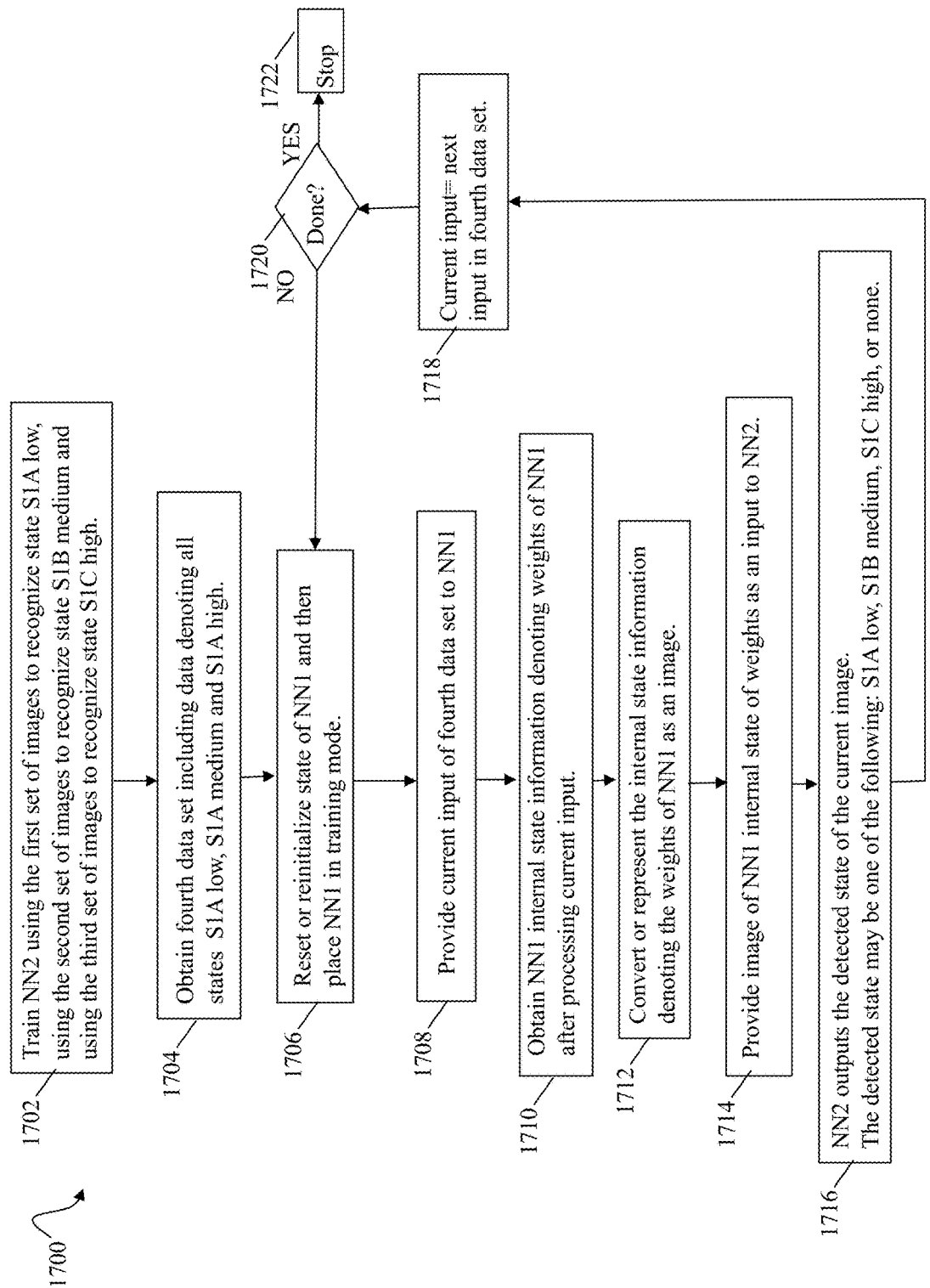

Referring to FIG. 20, shown is another flowchart 1700 of processing steps that may be performed in an embodiment in accordance with the techniques herein. The steps of the flowchart 1700 outline processing performed to train the NN2 1310 to detect the intermediate states S1A, S1B and S1C using the 3 set of images obtained from processing of FIGS. 19A and 19B. Subsequently, processing is performed then use the trained NN2 to now detect and recognize input images of a fourth data set denoting different ones of the intermediate states S1A, S1B and S1C.

At the step 1702, NN2 1310 is trained using the first set of images of the weights (from step 1610) to recognize the state 51A, using the second set of images of the weights (from the step 1618) to recognize the state S1B, and using the third set of images of the weights (from the step 1626) to recognize the state S1C. From the step 1702, control proceeds to the step 1704. At the step 1704, processing is performed to obtain a fourth data set including data denoting all the states S1A, S1B and S1C. From the step 1704, control proceeds to the step 1706. At the step 1706, processing is performed to reset or reinitialize NN1 back to the state at the first point in time as in step 1602 (e.g., reinitialize weights and bias values of NN1 to be as prior to any training to recognize states S1A, S1B and S1C). The step 1706 also includes placing NN1 into training mode whereby its weights and bias values may be adjusted. From the step 1706, control proceeds to the step 1708 to provide a current input image of the fourth data set to NN1 whereby NN1 is trained using the current input image. After NN1's weights are adjusted, in step 1710, processing is performed to obtain NN1's internal state information denoting the weights of NN1 after processing the current input image. From the step 1710, control proceeds to the step 1712. At the step 1712, processing is performed to convert or represent NN1's internal state information of weights (captured in step 1710) as an image. From the step 1712, control proceeds to the step 1714. At the step 1714, the image of NN1's internal state information of the weights is provided as an input into NN2. From the step 1714, control proceeds to the step 1716 where NN2 outputs a detected state of the current image. The detected state may be one of the following: S1A, S1B, S1C or none, wherein none indicates none of the 3 intermediate states has been detected. From the step 1716, control proceeds to the step 1718 where the current input is advanced to the next input image in the fourth data set. From the step 1718, control proceeds to the step 1720. At the step 1720, a determination is made as to whether all input images of the fourth data set have been processed. If the step 1720 evaluates to no, control proceeds to the step 1706 to continue with the next input image of the fourth data set. If the step 1720 evaluates to yes, control proceeds to the step 7022 where processing stops.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of detecting state changes in a system comprising:
   receiving a first neural network that is trained to detect when the system transitions into a first resulting state, wherein the system transitions into at least a first intermediate state prior to transitioning into the final resulting state;
   training the first neural network to recognize the first intermediate state using a first plurality of inputs denoting the system in the first intermediate state, wherein during said training the first neural network to recognize the first intermediate state, weights of the first neural network are adjusted at a plurality of different points in time after the first neural network has processed a portion of the first plurality of inputs;
   during said training the first neural network to recognize the first intermediate state, obtaining a plurality of sets of internal state information of the first neural network, each set of the plurality of sets denoting an internal state of the first neural network at one of the plurality of different points in time after the first neural network has processed a portion of the first plurality of inputs, wherein each set of the plurality of sets of internal state information includes adjusted weights captured at one of the plurality of different points in time during said training the first neural network;
   representing the plurality of sets of internal state information of the first neural network as a plurality of images;

providing the plurality of images as inputs to a second neural network; and training the second neural network, using the inputs of the plurality of images representing the plurality of sets of internal state information, to detect the first intermediate state.

2. The method of claim 1, wherein each set of the plurality of sets of internal state information includes weights that are applied to inputs of neurons of one or more hidden layers of the first neural network.

3. The method of claim 2, wherein each set of the plurality of sets of internal state information includes weights that are applied to inputs of neurons of an output layer of the first neural network.

4. The method of claim 3, wherein each of the plurality of images is a bitmap image.

5. The method of claim 1, wherein the first neural network is a convolutional neural network.

6. The method of claim 1, wherein the second neural network is a convolutional neural network.

7. The method of claim 4, further comprising:
providing a visual representation of the plurality of images on a user interface.

8. The method of claim 1, further comprising:
providing a first input to the first neural network while the first neural network is in training mode, wherein the first input denotes the system in the first intermediate state;

obtaining a first set of internal state information of the first neural network, the first set denoting an internal state of the first neural network after the first neural network has processed the first input; and subsequent to said training the second neural network to detect the first intermediate state, providing the first set of internal state information to the first neural network;

detecting, by the second neural network in response to the first set of internal state information, the first intermediate state; and generating an output by the second neural network indicating the first intermediate state denoted by the first input.

9. The method of claim 8, further comprising:
providing a visual representation of the first set of internal state information of the first network on a user interface.

10. The method of claim 8, further comprising:
responsive to detecting the first intermediate state denoted by the first input, taking a responsive action.

11. The method of claim 10, wherein the first resulting state denotes a failed, malfunctioning, defective or unhealthy component of the system, and wherein the first intermediate state denotes a lesser severity of failure, malfunctioning, defectiveness or unhealthiness than the first resulting state.

12. The method of claim 11, wherein the responsive action includes an action that remediates or corrects the component prior to the component transitioning into the first resulting state.

13. The method of claim 11, wherein the responsive action includes an action that is a recovery operation to be completed prior to an expected future point in time when the component is estimated to transition to the first resulting state.

14. The method of claim 1, wherein the system transitions into a second intermediate state prior to transitioning into the final resulting state and wherein the system transitions into the second intermediate state after the first intermediate state.

15. The method of claim 14, further comprising:
training the first neural network using a second plurality of inputs denoting the system in the second intermediate state;

obtaining a second plurality of sets of internal state information of the first neural network, each set of the second plurality of sets of internal state information denoting an internal state of the first neural network at a different point in time after the first neural network has processed at least a portion of the second plurality of inputs; and training the second neural network, using the second plurality of sets of internal state information, to detect the second intermediate state.

16. The method of claim 15, wherein each set of the second plurality of sets of internal state information includes adjusted weights that are applied to inputs of neurons of layers of the first neural network after the first neural network has processed at least a portion of the second plurality of inputs.

17. The method of claim 16, wherein the second plurality of sets of internal state information include a plurality of images, wherein each of the plurality of images represents adjusted weights applied to inputs of neurons of the first neural network after the first neural network has processed at least a portion of the second plurality of inputs.

18. A system comprising:
a processor; and
a memory comprising code stored thereon that, when executed, performs a method of detecting state changes in a system comprising:
receiving a first neural network that is trained to detect when the system transitions into a first resulting state, wherein the system transitions into at least a first intermediate state prior to transitioning into the final resulting state;

training the first neural network to recognize the first intermediate state using a first plurality of inputs denoting the system in the first intermediate state, wherein during said training the first neural network to recognize the first intermediate state, weights of the first neural network are adjusted at a plurality of different points in time after the first neural network has processed a portion of the first plurality of inputs;

during said training the first neural network to recognize the first intermediate state, obtaining a plurality of sets of internal state information of the first neural network, each set of the plurality of sets denoting an internal state of the first neural network at one of the plurality of different points in time after the first neural network has processed a portion of the first plurality of inputs, wherein each set of the plurality of sets of internal state information includes adjusted weights captured at one of the plurality of different points in time during said training the first neural network;

representing the plurality of sets of internal state information of the first neural network as a plurality of images;

providing the plurality of images as inputs to a second neural network; and training the second neural network, using the inputs of the plurality of images representing the plurality of sets of internal state information, to detect the first intermediate state.

19. A non-transitory computer readable medium comprising code stored thereon that, when executed, performs a method of detecting state changes in a system comprising:
receiving a first neural network that is trained to detect when the system transitions into a first resulting state, wherein the system transitions into at least a first intermediate state prior to transitioning into the final resulting state;
training the first neural network to recognize the first intermediate state using a first plurality of inputs denoting the system in the first intermediate state, wherein during said training the first neural network to recognize the first intermediate state, weights of the first neural network are adjusted at a plurality of different points in time after the first neural network has processed a portion of the first plurality of inputs;
during said training the first neural network to recognize the first intermediate state, obtaining a plurality of sets of internal state information of the first neural network, each set of the plurality of sets denoting an internal state of the first neural network at one of the plurality of different points in time after the first neural network has processed a portion of the first plurality of inputs, wherein each set of the plurality of sets of internal state information includes adjusted weights captured at one of the plurality of different points in time during said training the first neural network;
representing the plurality of sets of internal state information of the first neural network as a plurality of images;
providing the plurality of images as inputs to a second neural network; and
training the second neural network, using the inputs of the plurality of images representing the plurality of sets of internal state information, to detect the first intermediate state.

\* \* \* \* \*